United States Patent
Patrick et al.

(10) Patent No.: US 10,620,508 B2
(45) Date of Patent: Apr. 14, 2020

(54) OPTICAL ACCESSORIES CLIP FOR MOBILE DEVICES

(71) Applicant: PORTERO HOLDINGS, LLC, Lake Forest, CA (US)

(72) Inventors: Jason Patrick, Long Beach, CA (US); Joshua Cantor, Huntington Beach, CA (US); Chong Pak, Lakewood, CA (US)

(73) Assignee: PORTERO HOLDINGS, LLC, Lake Forest, CA (US)

(*) Notice: Subject to any disclaimer, the term of this patent is extended or adjusted under 35 U.S.C. 154(b) by 0 days.

(21) Appl. No.: 15/985,621

(22) Filed: May 21, 2018

(65) Prior Publication Data

US 2019/0353990 A1 Nov. 21, 2019

(51) Int. Cl.
*G02B 7/02* (2006.01)
*G03B 17/56* (2006.01)
*H04N 5/225* (2006.01)
*G02B 13/00* (2006.01)

(52) U.S. Cl.
CPC ............. *G03B 17/565* (2013.01); *G02B 7/02* (2013.01); *G02B 13/001* (2013.01); *H04N 5/2254* (2013.01)

(58) Field of Classification Search
CPC .... G03B 17/565; G03B 17/561; G03B 17/56; G03B 17/566; G03B 2205/0069; G02B 13/001; G02B 7/02; G02B 7/026; G02B 7/023; H04N 5/2254; H04M 1/04
See application file for complete search history.

(56) References Cited

U.S. PATENT DOCUMENTS

| | | | | |
|---|---|---|---|---|
| 2015/0042877 A1* | 2/2015 | O'Neill | ............... | H04N 5/2254 348/376 |
| 2015/0370150 A1* | 12/2015 | O'Neill | ............... | G03B 17/565 348/360 |
| 2016/0216597 A1* | 7/2016 | Lim | ............... | G03B 17/566 |
| 2016/0294996 A1* | 10/2016 | Yen | ............... | H04M 1/04 |
| 2018/0116509 A1* | 5/2018 | Myung | ............... | A61B 3/10 |

FOREIGN PATENT DOCUMENTS

CN    206413051 U    8/2017
TW    553431 U    9/2003

OTHER PUBLICATIONS

PCT, "International Search Report and Written Opinion", Application No. PCT/US2019/032046, dated Jul. 30, 2019, 14 pages.

* cited by examiner

*Primary Examiner* — Alicia M Harrington
(74) *Attorney, Agent, or Firm* — Dorsey & Whitney LLP

(57) ABSTRACT

An auxiliary lens assembly for releasably connecting one or more auxiliary lenses to an electronic device with an onboard camera, such as a mobile smartphone or a tablet computer. The lens assembly includes a first bracket, a second bracket movable coupled to the first bracket, and a release assembly coupled to the first and second brackets. When actuated by a user force, the release assembly moves the second bracket in a first direction away from the first bracket to increase a separation gap between the two brackets from an initial to an expanded position and when the user force is removed, the release assembly moves the second bracket in a second direction towards the first bracket to decrease the separation gap back to the initial position.

15 Claims, 26 Drawing Sheets

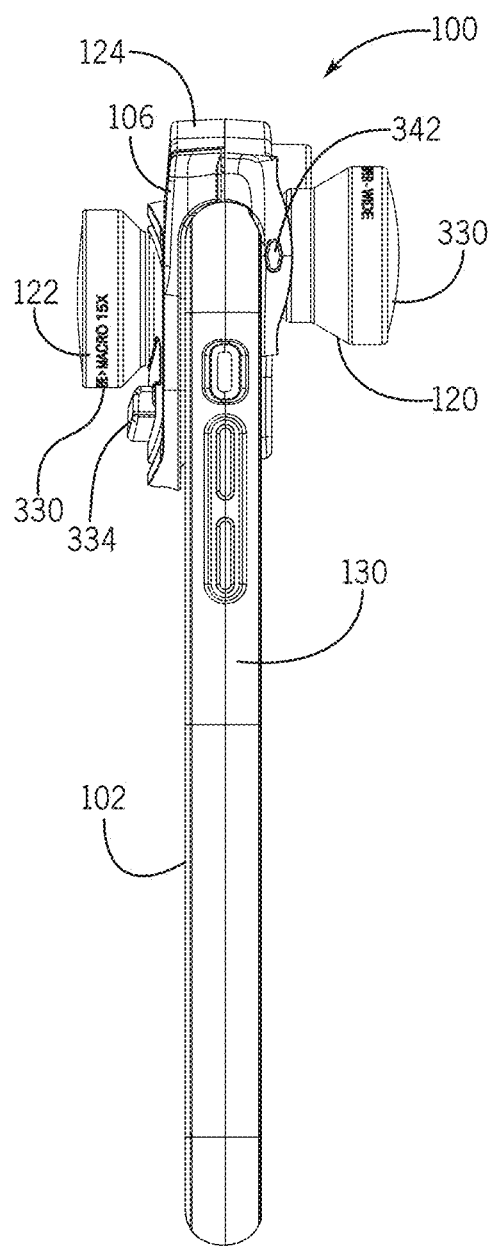
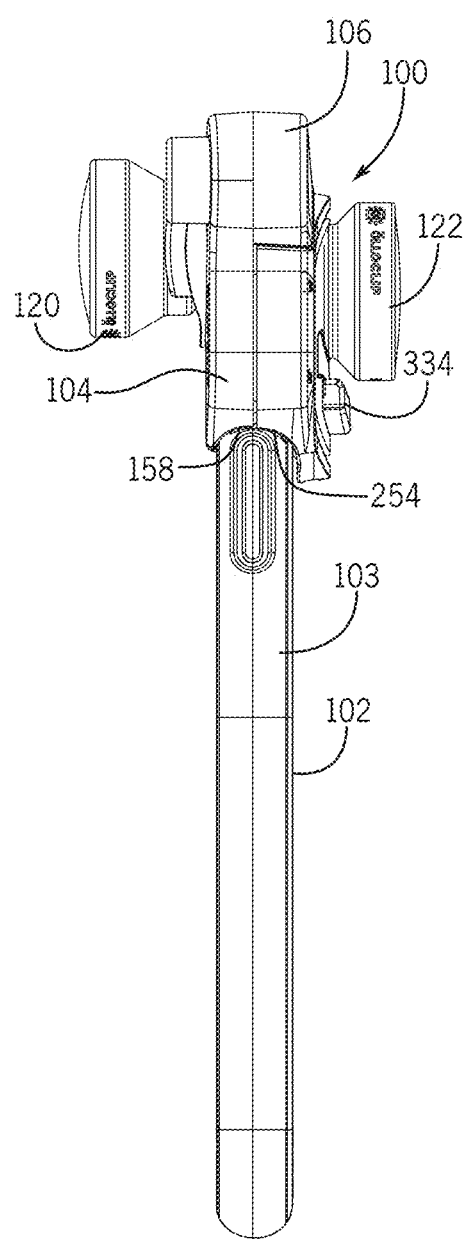
FIG. 3A
FIG. 3B

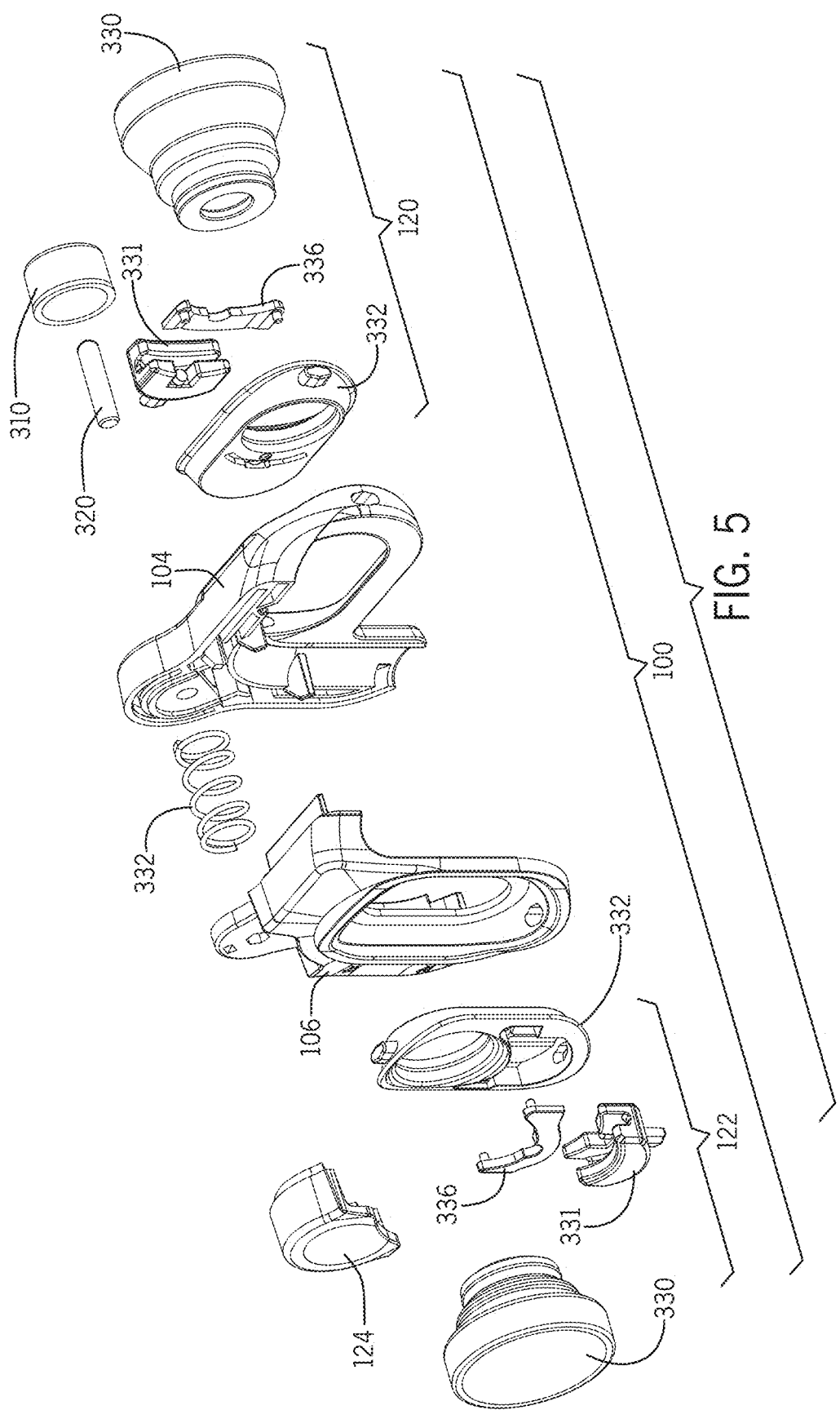

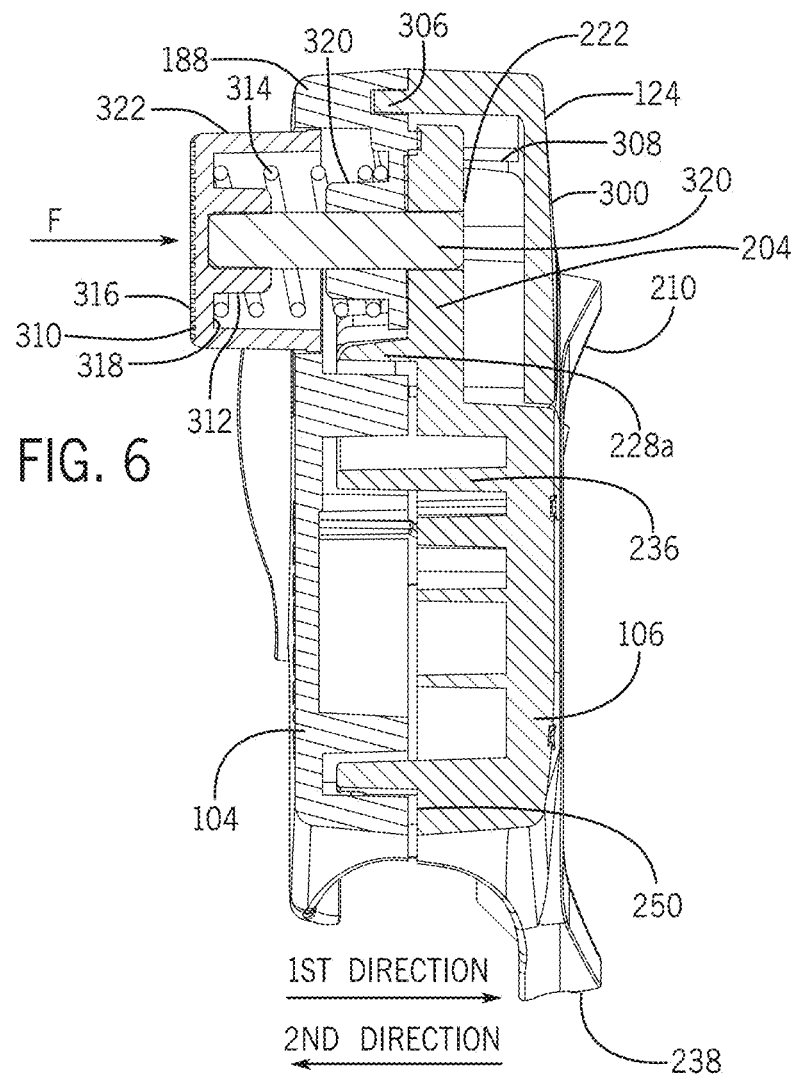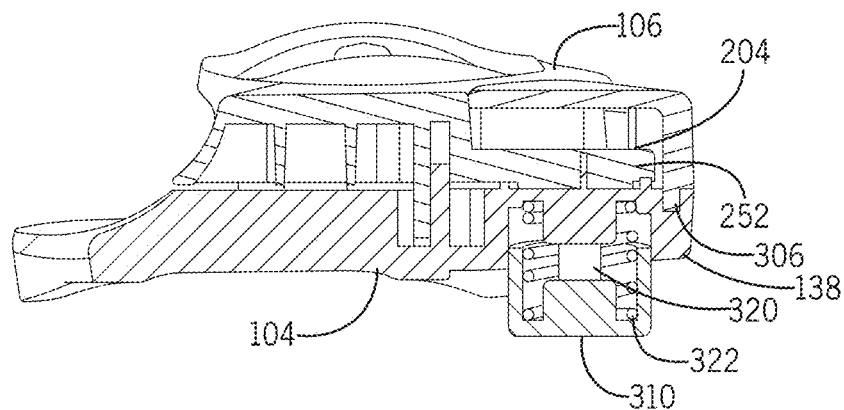

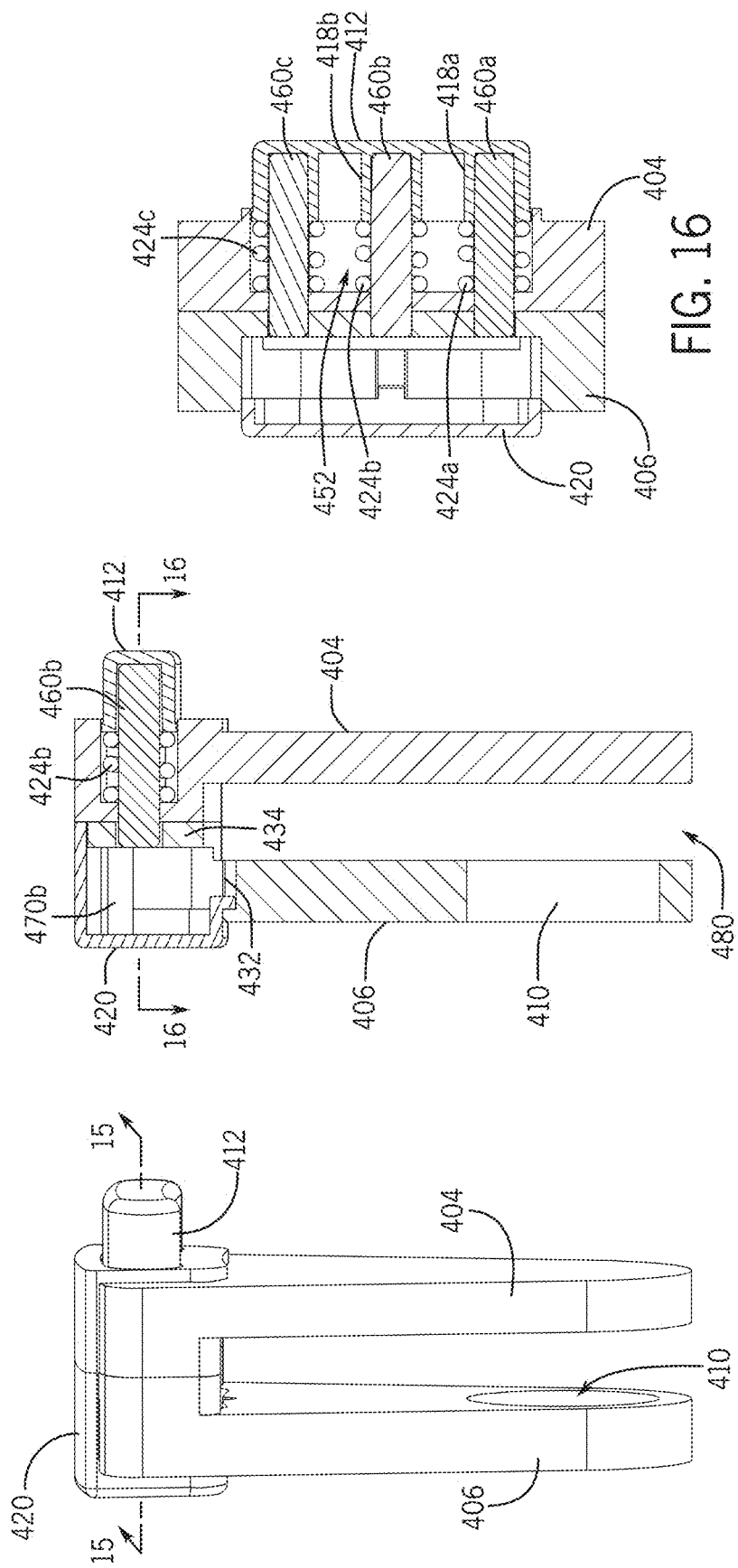

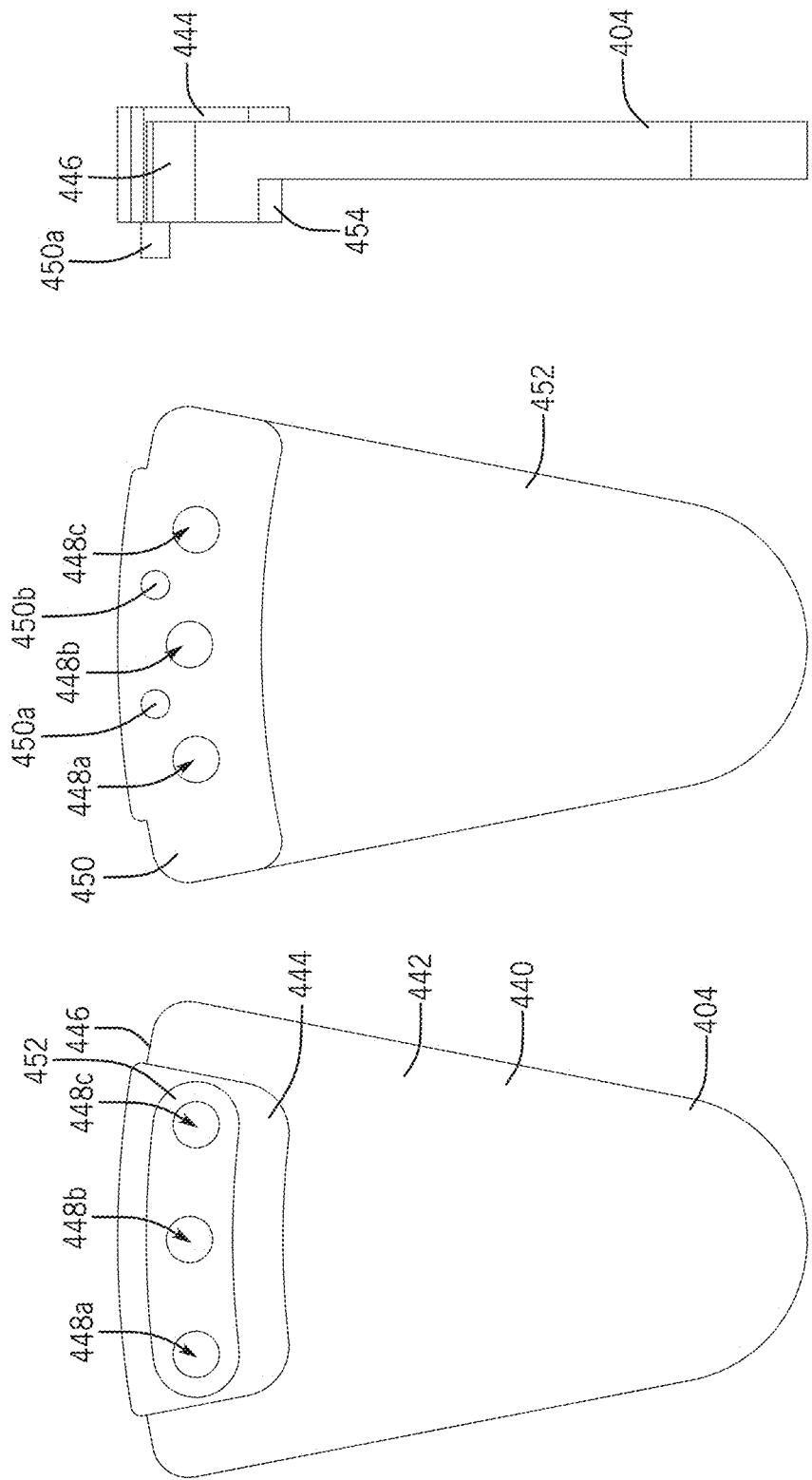

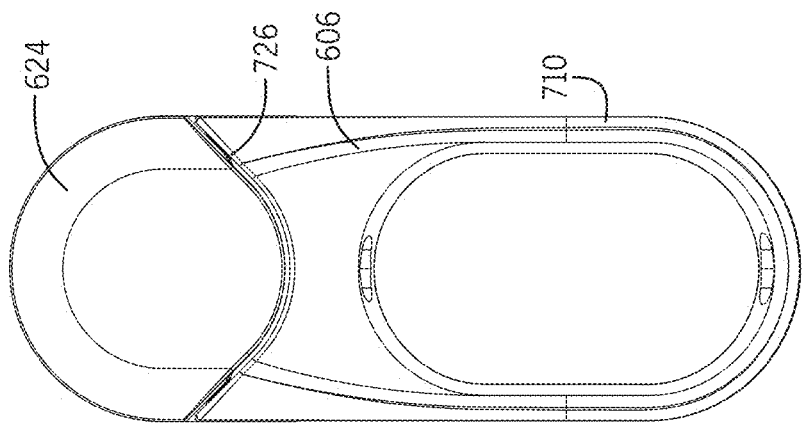
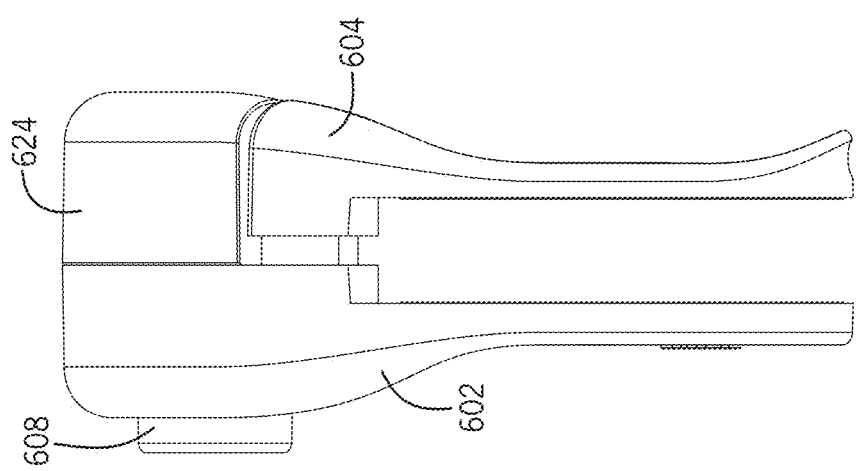
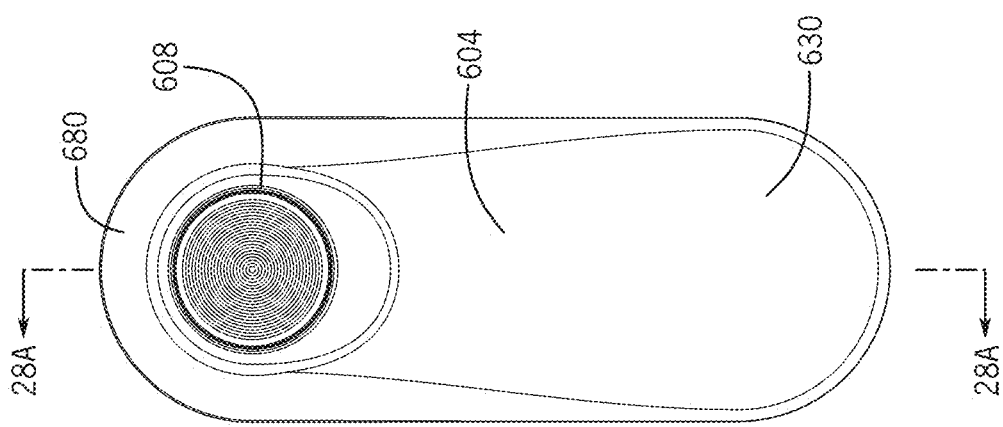
FIG. 26C
FIG. 26B
FIG. 26A

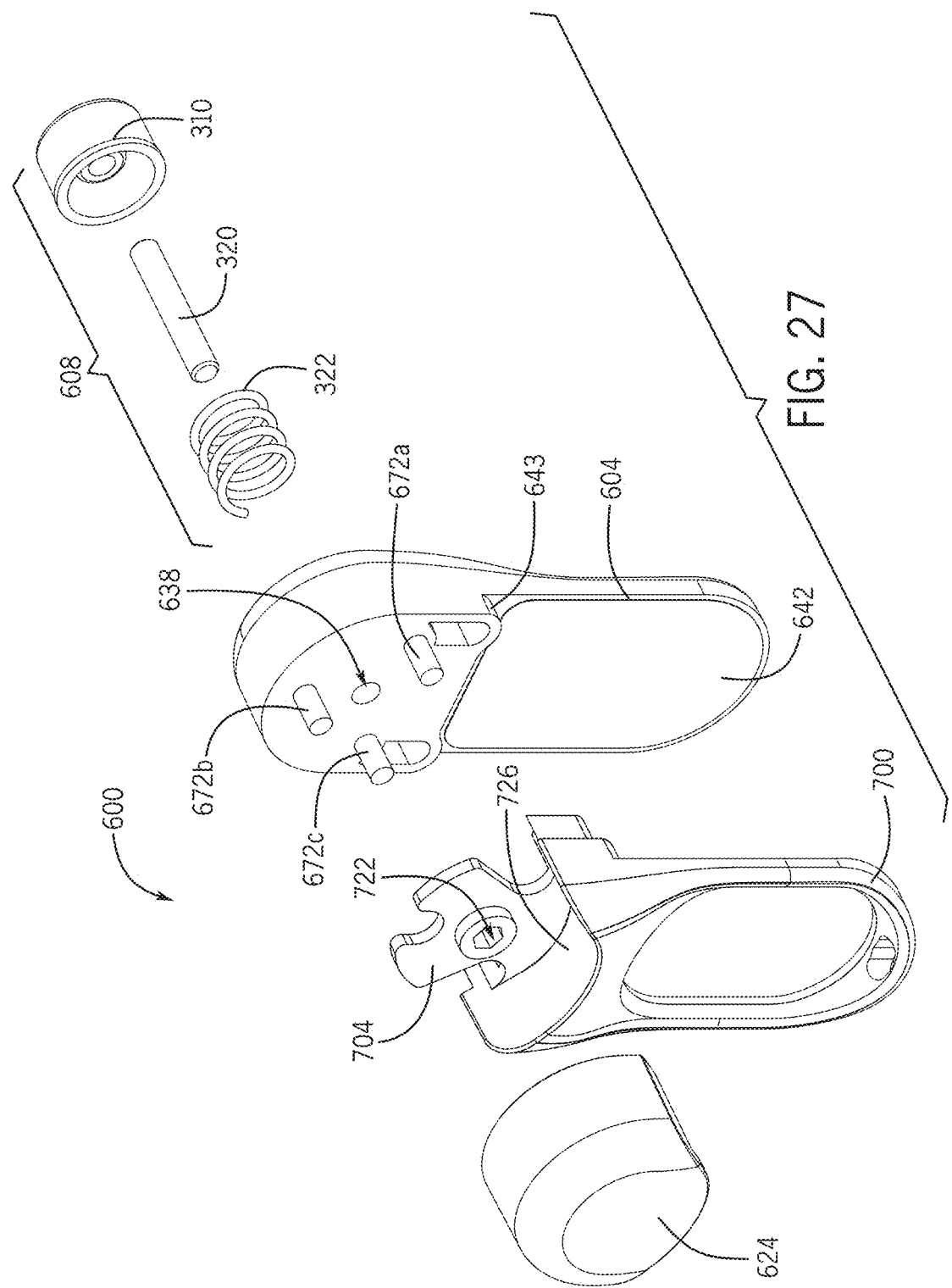

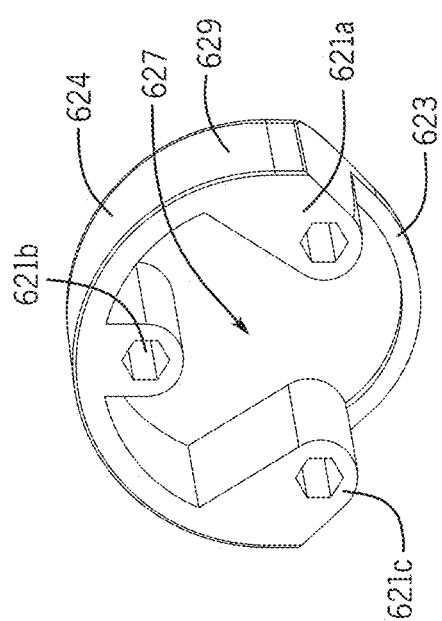
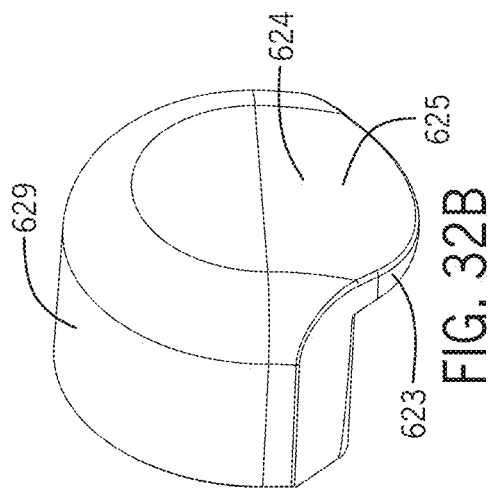
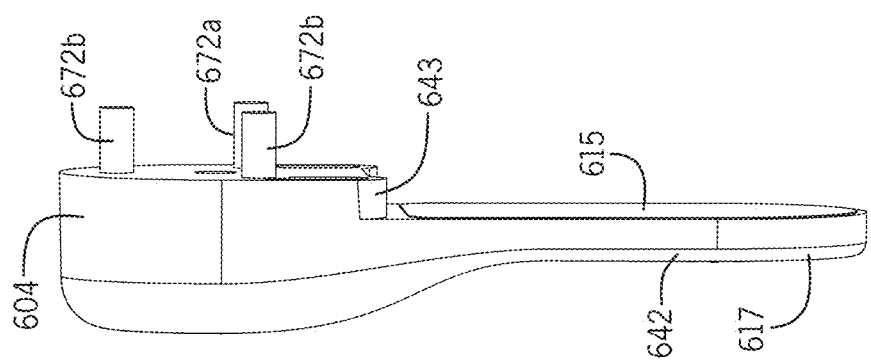
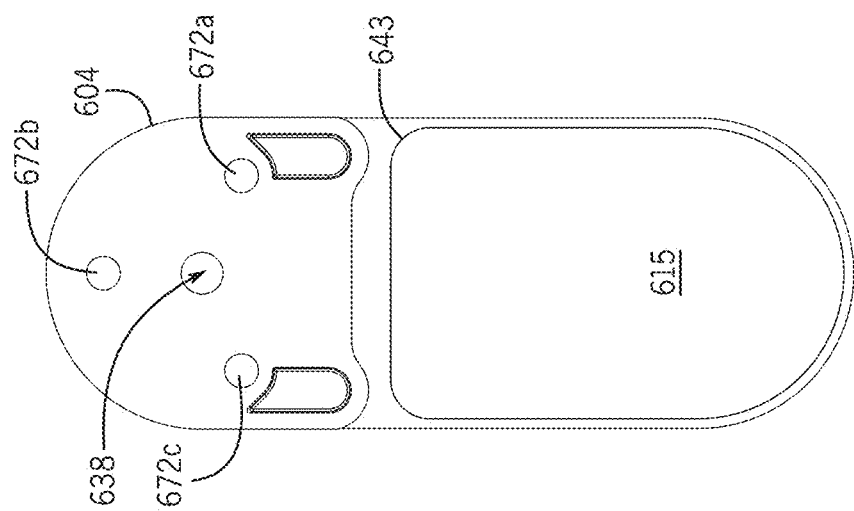

OPTICAL ACCESSORIES CLIP FOR MOBILE DEVICES

TECHNICAL FIELD

The technology described herein relates generally to methods and systems for connecting optical accessories, such as lenses, to mobile devices.

BACKGROUND

Mobile electronic devices, such as mobile phones, smart phones, tablet computers, gaming devices, and the like, often include cameras embedded or connected thereto, e.g., "on-board cameras." However, often users may wish to use auxiliary lenses with the on-board cameras to enhance, supplement, or change the captured images. Conventional devices for securing auxiliary lenses to mobile devices can be difficult to connect to and align with the on-board camera of the mobile device. Further, many auxiliary lens devices or carriers, are fixedly connected to a single type of lens or are otherwise are complicated to interchange the auxiliary lens.

SUMMARY

One example of the present disclosure relates to an auxiliary lens assembly for releasably connecting one or more auxiliary lenses to an electronic device with an on-board camera, such as a mobile smartphone or a tablet computer. The lens assembly includes a first bracket, a second bracket movable coupled to the first bracket, and a release assembly coupled to the first and second brackets. When actuated by a user force, the release assembly moves the second bracket in a first direction away from the first bracket to define an insertion or separation gap and when the user force is removed, the release assembly moves the second bracket in a second direction towards the first bracket to close or eliminate the separation gap.

In some embodiments, the first bracket may remain stationary during the attachment process. Additionally, in some instances the second bracket may move along a constrained path that maintains a parallel orientation between the two brackets during the motion.

In another embodiment, the present disclosure relates to a clamp for releasably coupling one or more optical lenses to a mobile device. The clamp includes a front bracket, a rear bracket movably coupled to the front bracket, an actuation assembly coupled to the front and rear brackets, and a rear camera lens assembly releasably coupled to the rear bracket. The actuation assembly is actuated by a user force to cause the rear bracket to move in a first direction laterally away from the front bracket and upon removable of the user force, the actuation assembly exerts a return force on the rear bracket to move the rear bracket in a second direction laterally towards the front bracket.

In yet another embodiment, the present disclosure relates to an accessory clip for mobile devices. The accessory clip may include a stationary bracket configured to engage a first side of the mobile device, a movable bracket configured to engage a second side of the mobile device, the movable bracket coupled to the stationary bracket, and a release assembly coupled to the stationary bracket and the movable bracket. The release assembly transmits a user force to the movable bracket to cause the movable bracket to move from a clamped position to a release position and exerts a return force on the movable bracket to cause the movable bracket to move from the release position to a clamped position.

BRIEF DESCRIPTION OF THE DRAWINGS

FIG. 3A is a left side elevation view of the auxiliary lens carrier and mobile device of FIG. 1.

FIG. 3B is a right side elevation view of the auxiliary lens carrier and mobile device of FIG. 1.

FIG. 5 is an exploded view of the auxiliary lens carrier of FIG. 1.

FIG. 6 is a cross-section view of the auxiliary lens carrier of FIG. 1 taken along line 6-6 in FIG. 3B.

FIG. 7 is a cross-section view of the auxiliary lens carrier of FIG. 1 taken along line 7-7 in FIG. 4A.

FIG. 14 is a side elevation view of the auxiliary lens carrier of FIG. 13A.

FIG. 15 is a cross-section view of the auxiliary lens carrier of FIG. 13A taken along line 15-15 in FIG. 14.

FIG. 16 is a cross-section view of the auxiliary lens carrier of FIG. 13A taken along line 16-16 in FIG. 13A.

FIG. 19A is a front elevation view of a second bracket of the auxiliary lens carrier of FIG. 13A.

FIG. 19B is a rear elevation view of the second bracket of FIG. 19A.

FIG. 19C is a left-side elevation view of the second bracket of FIG. 19A.

FIG. 26A is a front elevation view of the auxiliary lens carrier of FIG. 25A.

FIG. 26B is a right side elevation view of the auxiliary lens carrier of FIG. 25A.

FIG. 26C is a rear elevation view of the auxiliary lens carrier of FIG. 26A.

FIG. 27 is an exploded view of the auxiliary lens carrier of FIG. 25A.

FIG. 30 is an interior elevation view of a first bracket of the auxiliary lens carrier of FIG. 25A.

FIG. 31 is a side elevation view of the first bracket of FIG. 30.

FIG. 32A is an interior isometric view of the cap of auxiliary lens carrier of FIG. 25A.

FIG. 32B is an rear isometric view of the cap of FIG. 32A.

SPECIFICATION

Figure 2:
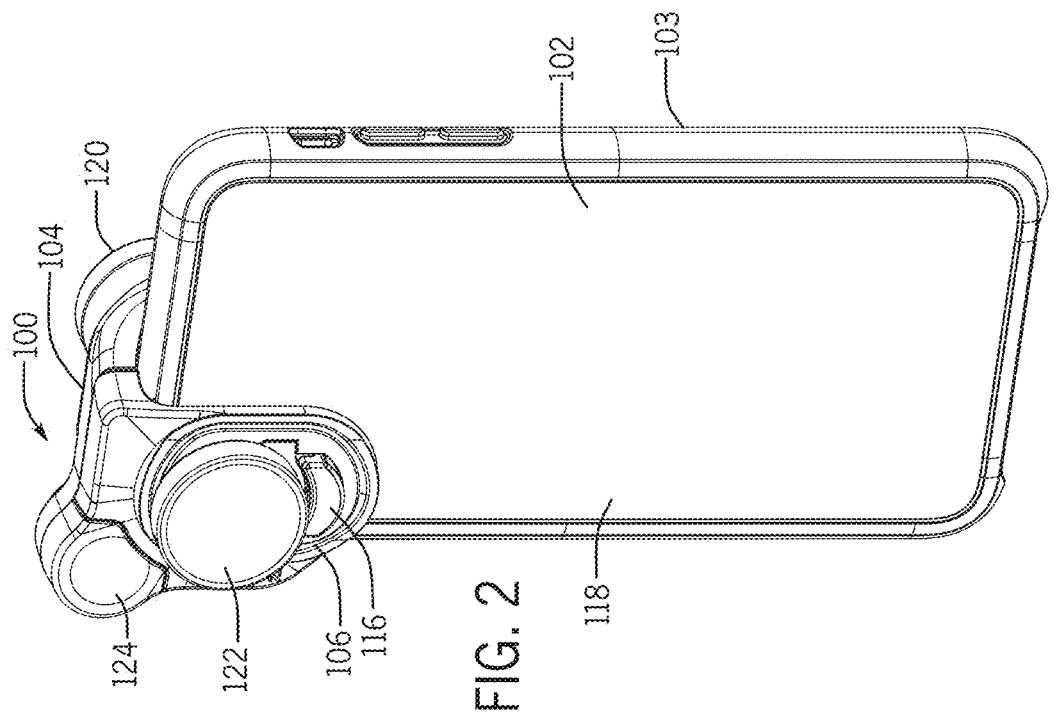
FIG. 2 is a rear isometric view of the auxiliary lens carrier coupled to the mobile device.
Figure 1:
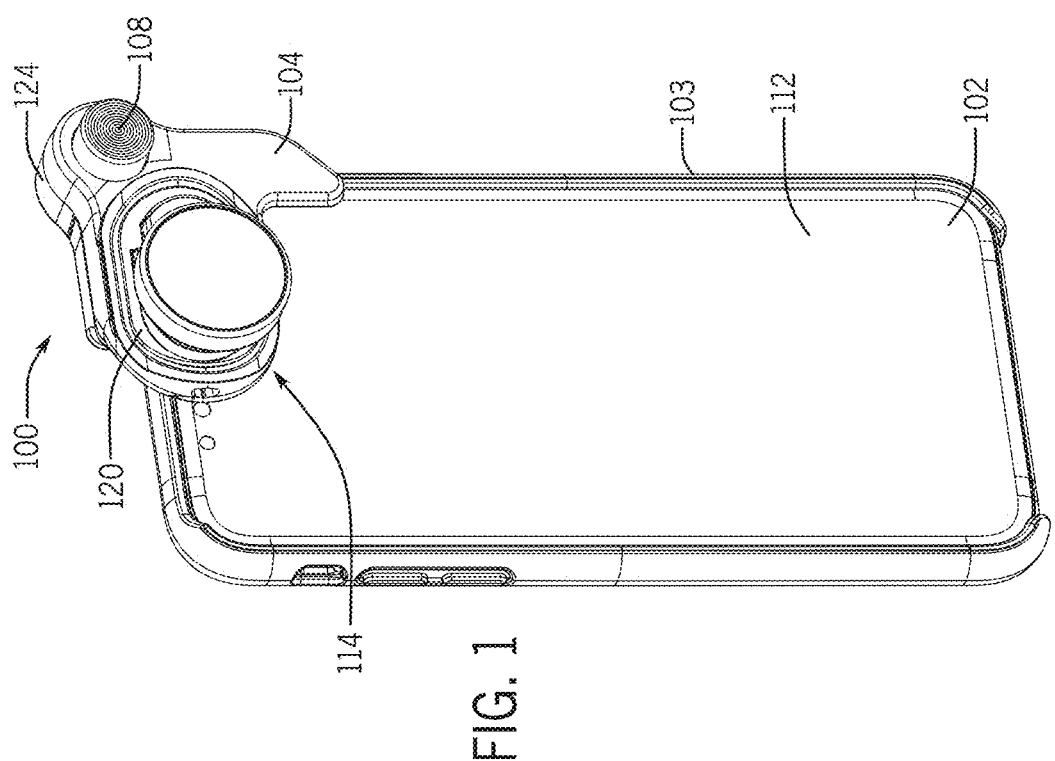
FIG. 1 is a front isometric view of an auxiliary lens carrier coupled to a mobile device.

The present disclosure is generally related to connection mechanisms for auxiliary lenses and other accessories for mobile devices or other components with on-board cameras. In some embodiments, an auxiliary lens carrier is disclosed that releasably connects to a mobile device, as well as releasably connects to one or more auxiliary lenses. The auxiliary lens carrier includes first and second or front and rear brackets coupled together and biased toward a clamped position. A release assembly acts to move the first and second brackets into an open position, to allow the carrier to be fitted over or disconnected from the mobile device. The release assembly may also include a biasing member that biases the front and second brackets towards the clamped position. In some embodiments, the release assembly is activated by a release button pressed by a user and one of the first or the second bracket is then moved away from the other bracket in a direction parallel to the user force.

One or more auxiliary lenses can be releasably connected to the first and second brackets. In some instances, two lenses (first or second; front or back) can be connected to the carrier to allow the user to utilize an auxiliary lens on two on-board cameras for the mobile device simultaneously.

Turning to the figures, the auxiliary lens carrier will be now be discussed in more detail. FIGS. 1-3B illustrate various views of the auxiliary lens carrier including two auxiliary lens assemblies connected to a mobile device. The auxiliary lens carrier 100, or connection system, couples to the mobile device 102 and is arranged to be positioned over and optically aligned with a first camera and a second camera lens of the device, e.g., a front-facing camera located on a front surface 112 of the device 102 and a rear-facing camera located on a rear surface 118 of the device 102. The lens carrier 100 may support one or more lens assemblies 120, allowing the lens assemblies to be optically coupled to the on-board cameras of the mobile device 102.

The auxiliary lens carrier 100 is fitted on the mobile device 100 in an attachment region 114 that provides a snug or friction fit against the surfaces 116, 118 of the mobile device 102 to help ensure that the carrier 100 does not move and remains in position, as well as prevents debris or the like, from entering under the carrier 100 and becoming positioned over the lens of either of the on-board cameras of the mobile device 102. Additionally, the auxiliary lens carrier 100 is configured to fit on the mobile device 102 directly or may be positioned on the device 102 when the device 102 includes a protective case 103.

Lens Carrier

Figures 4A, 4B:
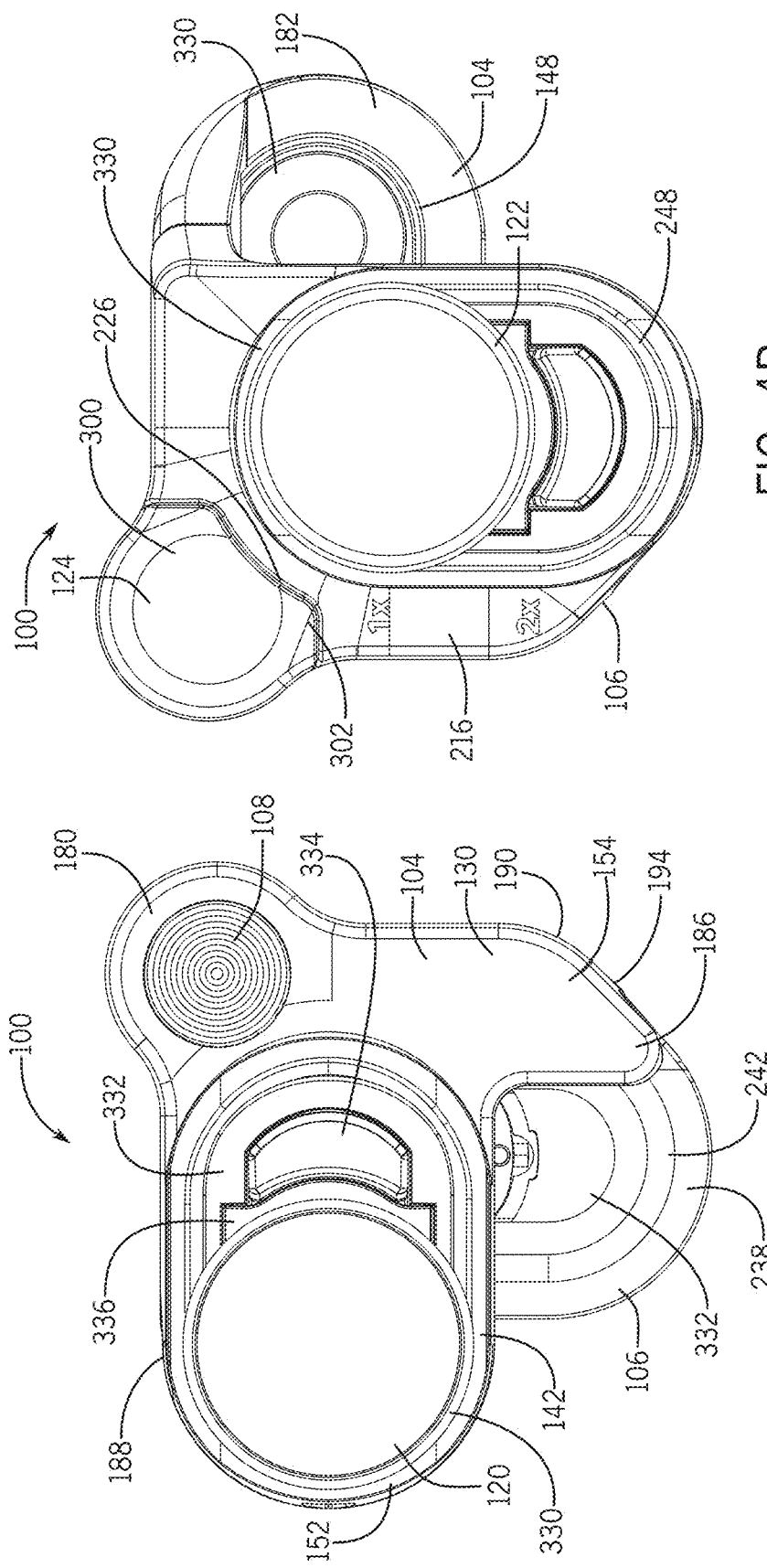
FIG. 4A is a front elevation view of the auxiliary lens carrier of FIG. 1.
FIG. 4B is a rear elevation view of the auxiliary lens carrier of FIG. 1.

The auxiliary lens carrier 100 will now be discussed in more detail. FIGS. 4A and 4B are front and rear elevation views of the lens carrier 100. FIG. 5 is an exploded view of the lens carrier 100. FIGS. 6 and 7 are various cross-sections of the lens carrier 100. With respect to FIGS. 4A and 4B, the auxiliary lens carrier 100 includes a first bracket 104, a second bracket 106, a release assembly 108, and a release cap 124, each of which are coupled together and explained in more detail below. In some embodiments, one bracket may be defined as a stationary bracket and the other bracket may be defined as a movable bracket. For example, the first bracket 104 may be stationary whereas the second bracket 106 may be a movable bracket and move relative to the first bracket.

Figure 13B:
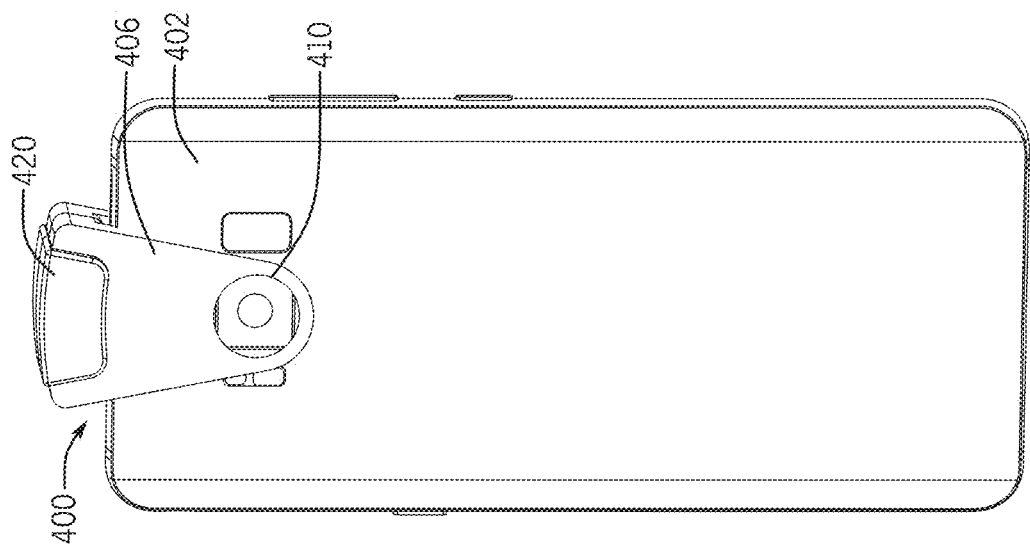
FIG. 13B is a rear isometric view of the auxiliary lens carrier and mobile device of FIG. 13A.
Figure 13A:
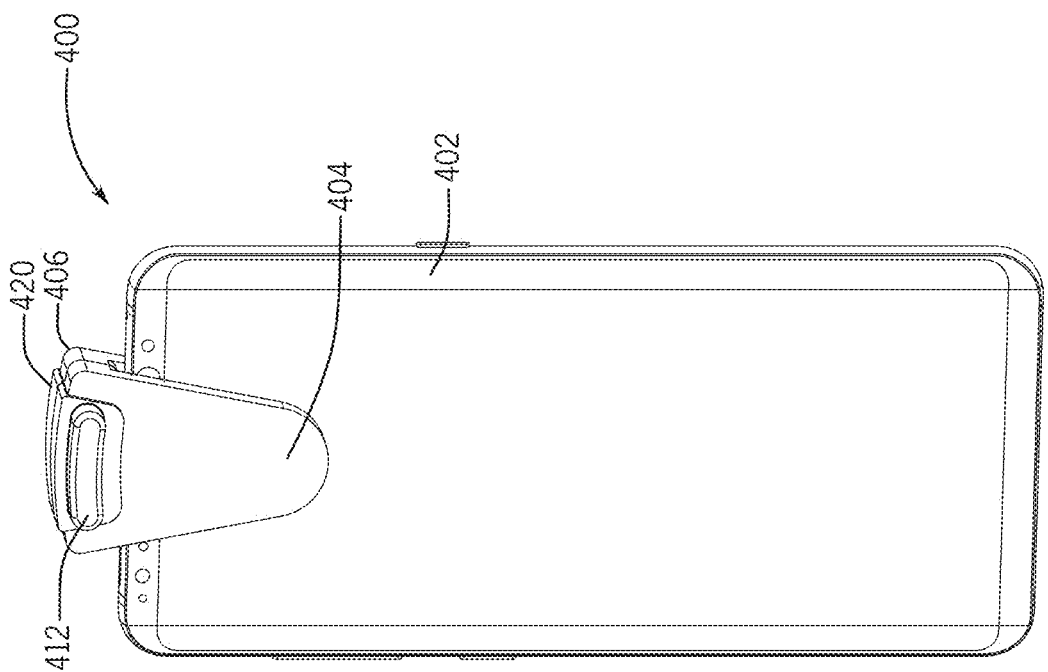
FIG. 13A is a front isometric view of another example of an auxiliary lens carrier attached to another example of a mobile device.

The first bracket 104 may be configured to be arranged on a front face of the mobile device 102 and align with the first or front-facing camera. The first bracket 104 forms a support arm for supporting various accessories so as to optically align the accessories with the front-facing on-board camera lens for the mobile device 102. Although in some embodiments (see, e.g., FIG. 13A), the first bracket may not include an attachment for a lens or other accessory. The first bracket is shown in more detail in FIGS. 8A-8D and with reference to these figures, the first bracket 104 includes a bracket body 130 having a front surface 154 and a rear surface 182, where the front surface 154 forms an exterior of the body 130 and the rear surface 182 is configured to engage with the mobile device 102. The body 130 may include an edge arm 186 extending downwards in a first direction, a support arm 142 extending horizontally from the body 130 so as to be substantially perpendicular to the edge arm 186, and a release ear 180 formed on an upper edge near an intersection between the two arms 142, 186.

The edge arm 186 may be configured to align with and engage with a first edge of the mobile device 102 and/or a case positioned around the first edge of the mobile device 102. In some embodiments, the edge arm 186 includes an angled bottom edge 194, such that an exterior wall 190 is shorter in length than the interior wall 192 of the edge arm 186. However, in other embodiments, the arm may be differently configured.

Figure 8A:
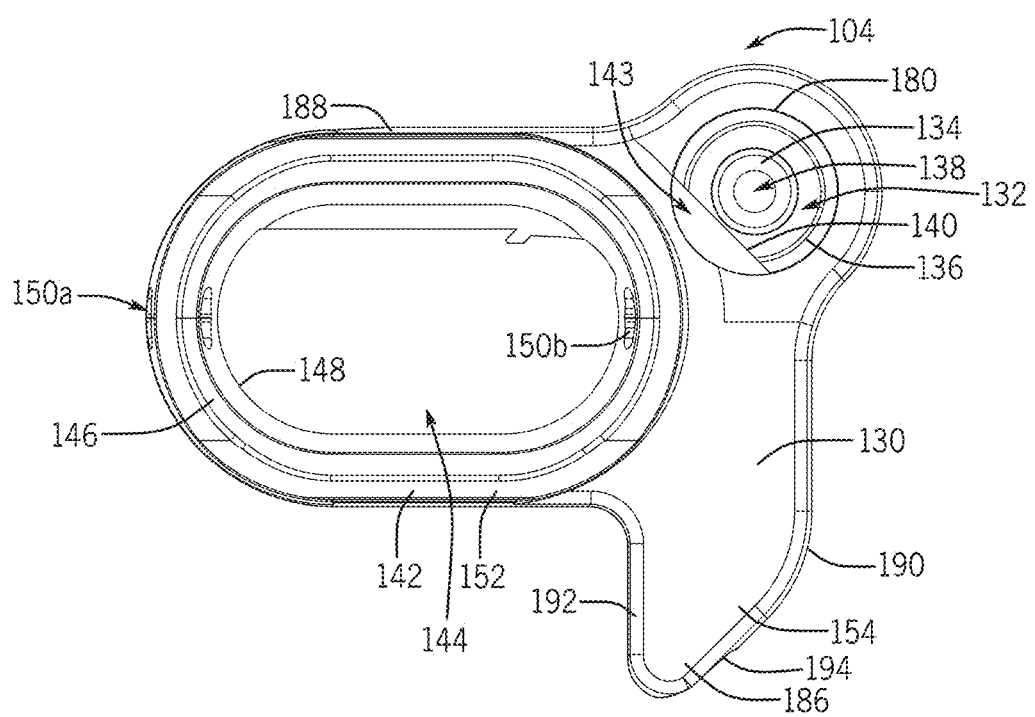
FIG. 8A is a front elevation view of a first bracket of the auxiliary lens carrier of FIG. 1.
Figure 8B:
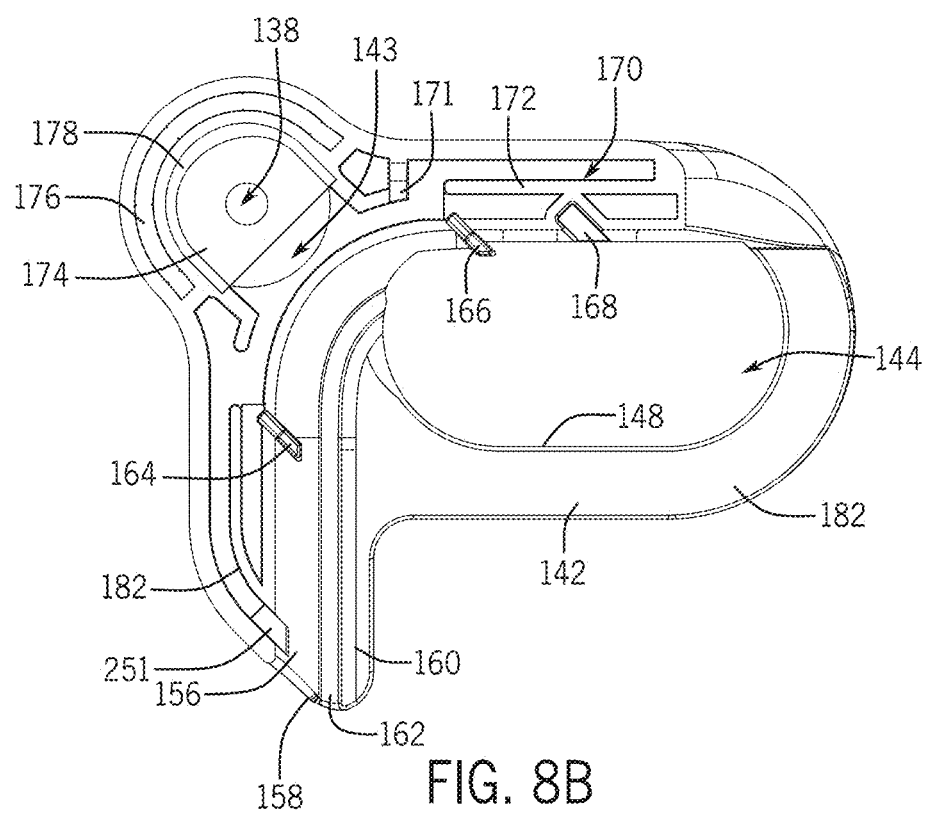
FIG. 8B is a rear elevation view of the first bracket of FIG. 8A.
Figure 8C:
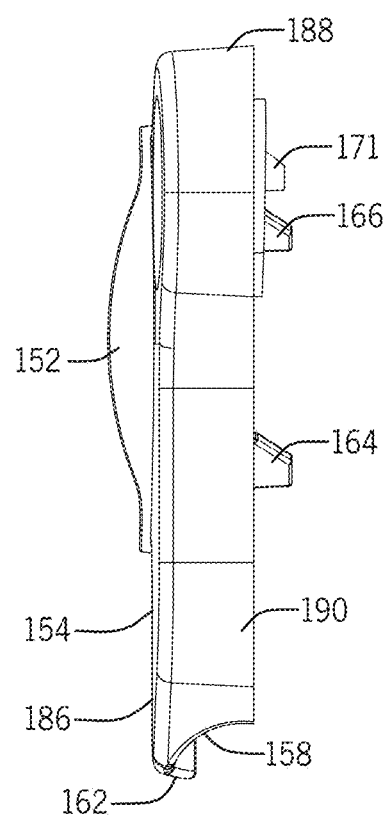
FIG. 8C is a right side elevation view of the first bracket of FIG. 8A.
Figure 8D:
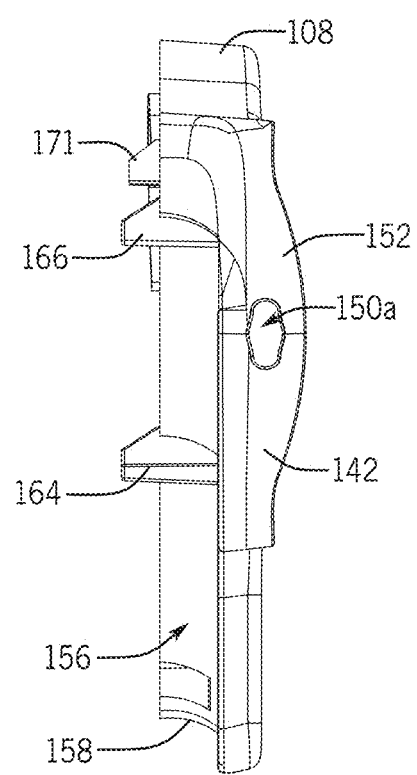
FIG. 8D is a left side elevation view of the first bracket of FIG. 8A.

With reference to FIG. 8B, the rear surface 182 of the edge arm 186 may include an edge groove 156 formed therein. The edge groove 156 is recessed and defines a curved track that extends along the entire arm 186 and up towards the release ear 180. The edge groove 156 is shaped and sized so as to receive a portion of the first side and top edges of the mobile device 102. In these instances, the edge groove 156 is configured to substantially match the curvature and depth of the perimeter top and side edges of the mobile device 102 and may be configured to receive and align with a corner intersection between the top and side edges of the mobile device 102. The edge arm 186 may also include one or more support ribs 182 or other structures arranged on the sections surrounding or opposite of the edge groove 156. For example, as shown in FIG. 8B, a support rib 182 may extend alongside of the edge drove 156 to structurally enhance the remaining sections of the arm 186.

The rear surface of the edge arm 186 may include a transition wall 162 that may be an angled wall that extends from a bottom of the edge groove 156 outwards until transitioning into an engagement surface 160. The engagement surface 160 may be formed as a planar surface that engages with the mobile device 102.

With reference again to FIG. 8A, the support arm 142 will now be discussed. The support arm 142 forms the supporting structure for the lens assemblies 120, 122 or other accessories there are couple to the carrier 100. The length and configuration of the support arm 142 may be varied as desired and depending on the location and configuration of the on-board camera on the mobile device 102 or other feature that is being alighted with the attached accessory. In one example, the support arm 142 is formed as an oval shaped extension that defines a support window 144 therethrough. The support window 144 is arranged to be positioned over the on-board camera such that the lens assembly 120, 122 can be optically aligned with the on-board camera. The support arm 142 may include a window rim 152 extending outwards and surrounding the perimeter of the support window 144. In some instances, the window rim 152 may have an angled surface and vary in height as it extends around the support arm 142 and window 144. A seat 146 may be positioned on a top edge or outer edge of the interior wall 148 forming an interior surface of the support arm 144. The seat 146 is configured to receive a portion of the lens assembly 120, 122 and may be located radially inwards from the window rim 152, i.e., closer towards a center of the window 144 and recessed from the outermost edge surface of the window rim 152.

One or more securing apertures 150a, 150b may be defined on opposite ends of the interior wall 148 defining the window 144. The securing apertures 150a, 150b are configured to receive supporting elements for the lens assemblies 120, 122 to secure the assemblies to the carrier 100. The securing apertures 150a, 150b are variable based on type of connection for the lens assemblies, but in one example are formed as keyed shaped apertures extending through the interior wall 148 having a circular middle shape with two rectangular cutout shaped tabs extending from each side of the circular cutout.

With reference to FIG. 8B, the top end of the support arm 142 transitions to form a top surface 188 of the bracket 104. An interior side of the support arm 142 extends downward from the top surface 188 and forms a connecting surface that engages with the second bracket 106. In some examples, the connecting surface includes a track cavity 170 defined along a length of the arm 142 and a support rib 172 may extend parallel to the track cavity 170 to provide additional rigidity for the arm 142. A prong 171 may extend perpendicularly to the connection surface and be positioned at an intersection between the ear 108 and the support arm 142. A tang receptor 168 may be formed as an angled slot on a bottom portion of the connecting surface. As shown in FIG. 8B, in some embodiments, the connecting surface may be extended outward from the plan of the rear surface 182 and in some embodiments the width of the extension may be selected to substantially match a portion of the width of the mobile device 102.

The first bracket 102 may also include one or more engagement tangs 164 or arms configured to engage one or more surfaces of the mobile device 102 or securing case. In one example, the edge arm 186 and the connecting surface of the support arm 142 may each include an engagement tang 164 extending away from an interior edge. For example, the tang 166 may extend downward and outward from the connecting surface of the support arm 142 and the engagement tang 164 may extend inwards from a sidewall forming the edge groove 156.

With reference to FIGS. 8A and 8B, the release ear 180 acts to support the release assembly 108, as well as provide a visual and tactile alignment feature for a user to align the accessory clip 100 to the mobile device 102. The release ear 180 may be formed as a circular protrusion on an exterior top edge of the bracket 104. The release ear 180 may also be aligned with a corner of the edge groove 156 configured to receive an edge corner of the mobile device 102. The release ear 180 includes various features to engage with and support the release assembly 108. For example, a front or exterior side of the ear 108 includes a release compartment 132 recessed from the front surface 154 and having a back release wall 174 forming a back wall of the compartment 132. A spring post 134 extends outwards from the release wall 174 and may be positioned within a central region of the compartment 132. The spring post 134 includes a pin aperture 138 defined through a center axis thereof. A front ledge 136 may extend inwards from an outer wall of the release compartment 132 and extend radially inwards. In some embodiments, the front ledge 136 is formed in a semi-circular manner or U shape and matches the shape of the release wall 174. A compartment aperture 143 is formed as a semi-circular cutout through the back release wall 174, however, in other embodiments, the aperture 143 may be omitted or shaped in other manners.

With reference to FIG. 8B, on the interior side of the release ear 180, a lip 178 may be formed along the outer perimeter or portion thereof of the release wall 174. In one embodiment, the lip 178 is U-shaped and does not extend across the flat wall area of the release wall 174. Spaced outward form the lip 178 is a cap trough 176 that may follow the lip 178 and be formed as a U-shaped groove extending around an outer edge of the release ear 108.

With reference to FIGS. 9A-9D, the second bracket 106 will now be discussed in more detail. The second bracket 106 or movable bracket may be substantially similar to the first bracket 104, but may be configured to align with and engage the second on-board camera of the mobile device 102, e.g., a rear facing camera. For example, in some instances, the rear facing camera of the mobile device 102 may be positioned closer towards an edge of the device as compared to a front-facing camera that may be positioned in a middle section of the device 102. In these instances, the support arm 200 of the second bracket 106 may extend in a direction opposite to that of the support 142. For example, the support arm 200 may extend perpendicular to the extension of the support arm 142 of the first bracket 104. The shape of the main body 220 of the bracket 106 may be varied based on a desired orientation on the mobile device 106. For example, as shown in FIGS. 13A-13B and FIGS. 21-22, the second bracket may extend in a direction that matches the extension direction of the first bracket.

The support arm 200 is similar to the support arm 142 and includes a support window 208 defined therethrough configured to receive one or more accessory attachments. To this end, the interior wall 212 of the window 208 may include two or more securing apertures 214a, 214b, which may be keyed or otherwise shaped, to receive securing elements, such as prongs, for the accessory attachments, e.g., the circular center with rectangular shaped tabs extending from the sides. However, in other embodiments where other types of attachment mechanisms are used, the apertures 214a, 214b may be omitted, different sized, shaped, or located.

In some embodiments, a window rim 210 may extend outwards from the front surface 216 of the arm 200. The window rim 210 may extend around a perimeter of the window 208 and may vary in thickness as it extends around a perimeter. In one embodiment, the top and bottom sides of the window rim 210 may be thicker than the sidewalls, but in other embodiments, the rim 210 may be otherwise configured. A window seat 248 may extend into the support window 208 from the window rim 210, with the seat 248 defining the exterior edge of the interior wall 212.

Figures 9A, 9B:
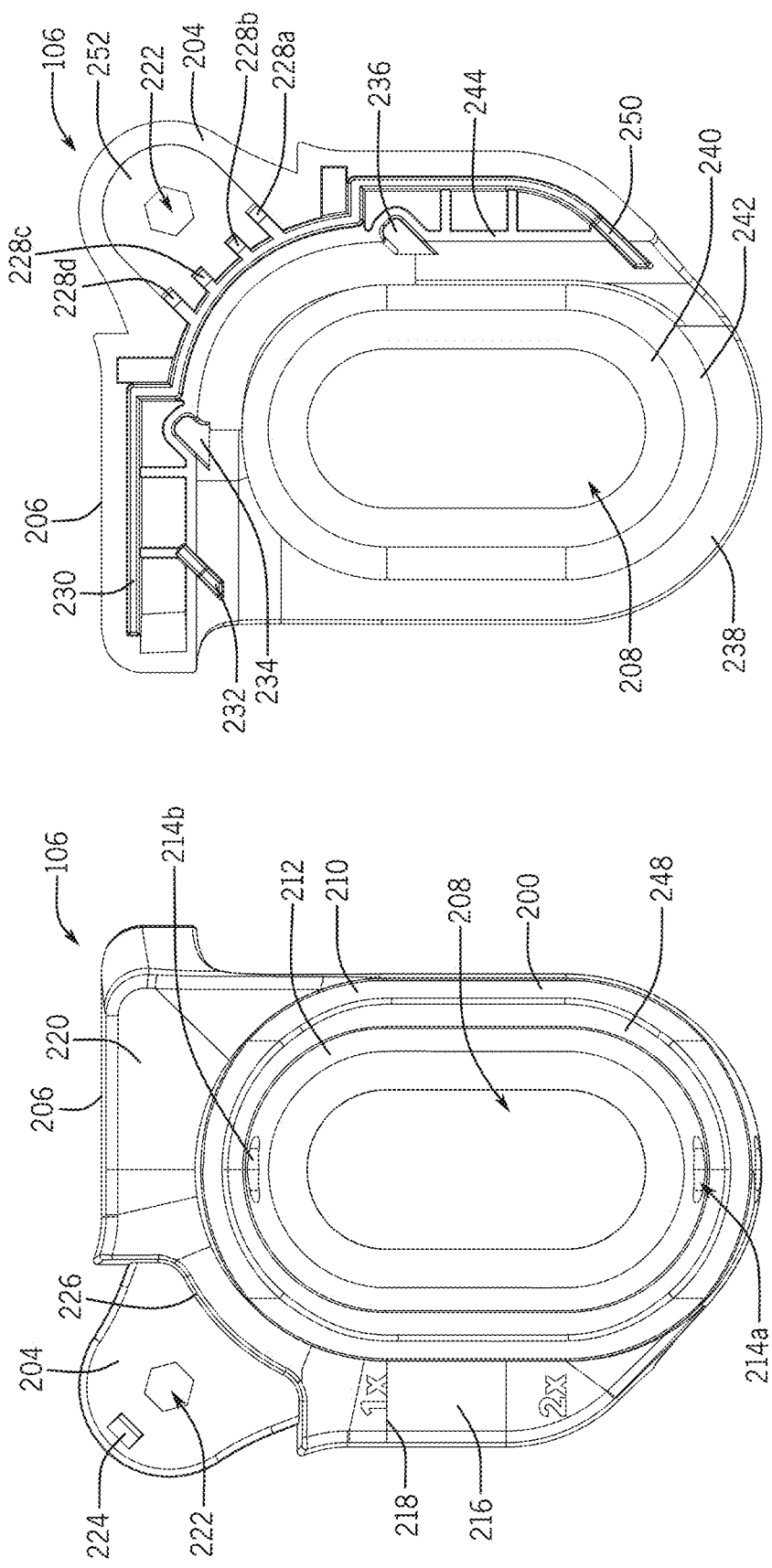
FIG. 9A is a front elevation view of a second bracket of the auxiliary lens carrier of FIG. 1.
FIG. 9B is a rear elevation view of the second bracket of FIG. 9A.
Figure 9C:
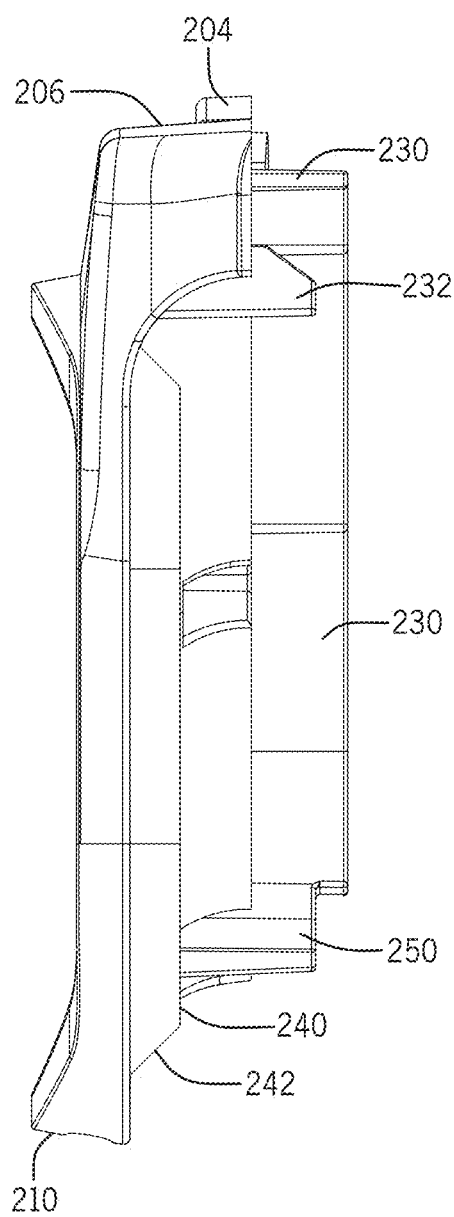
FIG. 9C is a left side elevation view of the second bracket of FIG. 9A.
Figure 9D:
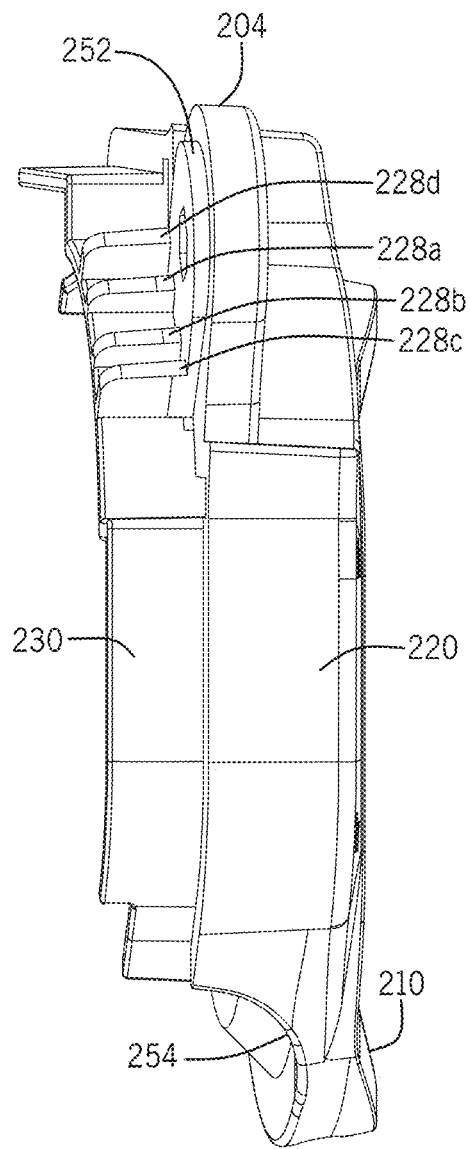
FIG. 9D is a right side elevation view of the second bracket of FIG. 9A.

With continued reference to FIG. 9A, in some embodiments, the front surface 216 of the main body 220 may include one or more alignment or installation icons 218. In one embodiment, the installation icons 218 may indicate the type of camera or location of the camera that they should be aligned with when the user installs the carrier 100 on the mobile device 102. The icons 218 may be graphics, text, raised sections, or the like, and be configured to alert a user to an orientation or position of the carrier 100.

With reference to FIG. 9B, the interior surface 238 of the support arm 200 may include a perimeter wall 242 extending around the support window 208. The perimeter wall 242 may extend an angle to define a beveled edge and terminate in an alignment edge 240. The alignment edge 240 may be formed as a planar surface forming the interior edge of the support window 208 on the interior side of the support arm 200. The shape and dimensions of the wall 242 and ledge 240 may be configured to match with a top surface of the mobile device 102 to engage the surface of the mobile device 102, including any variations surrounding the on-board cameras.

A shelf 230 extends around the top portion of the interior side of the second bracket 206. For example, the shelf 230 may be formed as a top horizontal member curving around a corner of the bracket and then terminating in a side vertical member. The shelf 230 extends outwards from the interior surface of the main body to define a support member for the first bracket 104 as will be discussed in more detail below. To that end, in some instances, one or more strengthening ribs may be formed to support the shelf 230 along its track.

An edge groove 244 may be formed along a first side of the perimeter wall 244 and may include a corner portion and a leg portion. The edge groove 244 has a curvature and depth to match the mobile device 102, since the edge groove 244 will act to receive a portion of an edge of the mobile device 102. In some embodiments, the edge groove is formed as a concavely shaped circular groove extending upwards from the bottom end of the bracket up towards the release ear and around the support window.

As with the first bracket 104, the second bracket 106 may include one or more engagement tangs 232, 250 at various locations of the bracket. The angle and shape of the engagement grooves 232, 250 are selected to engage various sections of a perimeter of the mobile device 102. Similarly, one or more tang receptor grooves 234, 236 may be formed along the interior surface of the main body 220.

With reference again to FIG. 9A, the second bracket 106 may also include a release ear 204. The release ear 204 may be similar to the release ear 180 and be formed on a top corner edge of the bracket 106. In some instances, the release ear 204 may be spaced apart from the front surface 216 of the bracket 106 such that a shoulder 226 is defined between the front surface 216 and the location of the ear 204. The release ear 204 may include a detent 224 defined on a top edge and a pin aperture 222 defined through a central area thereof. The pin aperture 222 may be keyed or otherwise structured to prevent rotation or movement of the pin for the release assembly as discussed in more detail below.

With reference to FIG. 9B, the interior of the release ear 204 may include a strengthening plate 252, which may be formed as an increased thickness of material around the pin aperture 222 to provide additional strength and rigidity for the ear 204. Additionally, one or more ear ribs 228a, 228b, 228c, 228d may be formed as upwardly extending ribs from the curved portion of the shelf 230.

With reference to FIGS. 5, 6, 7, and 10A-10B, the release assembly will now be discussed in more detail. The release assembly acts to exert a force on at least one of the first and second brackets to move them toward or away from one another. In one embodiment, the release assembly transmits a force to the second bracket, causing the second bracket to move away from the first bracket. In one example, the release assembly 108 includes an actuator 310, a biasing member 322, a rigid member 320, and optionally a leverage cap 124, each of which will be discussed below.

The actuator 310 receives a user force and may be formed as a button, lever, or the like. The actuator 310 transmits a user force to the biasing member 322, as will be discussed in more detail below. With reference to FIG. 6, in one embodiment, the actuator 310 may be formed as a circular shaped button and include a front surface 316 defining a user engagement surface and a rear surface 318. The rear surface 318 may define a spring cavity 314 for receiving a portion of the biasing member 322. Additionally, a keyed post 312 may extend outwards from a central area of the rear surface 318. The key post 312 includes a keyed compartment therethrough for receiving and securing the rigid member 320, which allows the actuator 310 to transmit force from the user to the rigid member 320 and prevents the rigid member 320 from moving relative thereto. In some embodiments, the rigid member 320 or exertion member may be secured to the actuator 310 in manners other than a friction or keyed fit and in these instances, the key post 3212 and keyed compartment can be omitted or formed in other manners, e.g., un-keyed or the like.

With reference again to FIG. 5, the biasing member 322 acts to exert a biasing force or return force on the actuator 310. In some embodiments, the biasing member 322 is formed as a compression spring, but in other embodiments, may be differently configured, such as a leaf spring, or other type of force exerting member.

Figure 10A:
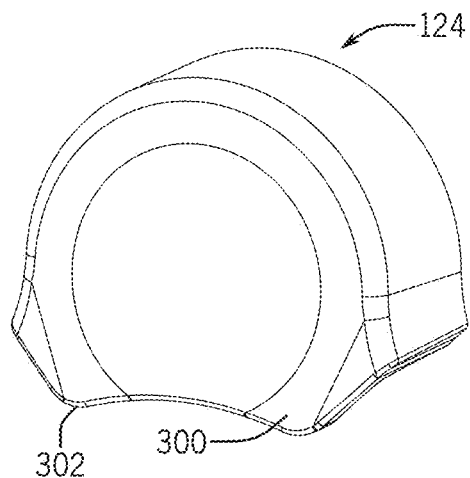
FIG. 10A is a front isometric view of a cap for the release assembly of the auxiliary lens carrier of FIG. 1.
Figure 10B:
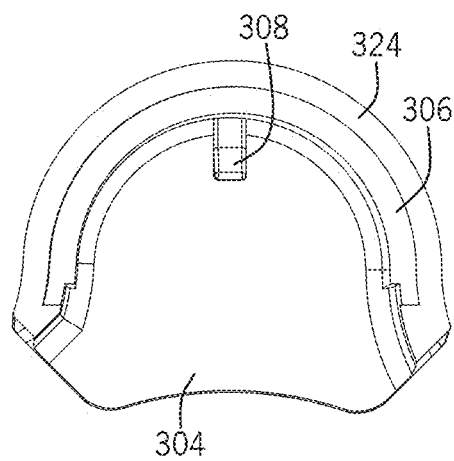
FIG. 10B is a rear isometric view of the cap of FIG. 10A.

With reference to FIGS. 10A and 10B, the cap 124 will now be discussed in more detail. The cap 124 acts to provide additional leverage and strength for the release assembly 108 and to assist a user in actuating the actuator 310. The cap 124 includes a front surface 300 having a contoured bottom edge 302. The contoured bottom edge 302 correspond to a top surface of the second bracket 106 and may be varied as desired. In one example, the contoured edge, includes two shoulder areas on the edges with a raised curved section in the middle of the cap. With reference to FIG. 10B, the rear surface 304 includes a rear wall 324 extending around a substantial portion of the perimeter edge of the rear surface 340. For example, the rear wall 324 may extend around all but one edge of the cap 124 to define a U-shaped wall. The rear wall 324 may also include an engagement lip 306 extending from a portion of the top surface. The lip 306 may be located radially inward from the outer edge of the rear wall 324. The rear surface 304 of the cap 124 may also include a prong 308 extending outwards therefrom. The prong 308 may be located at a center of the rear wall 324.

To assemble the lens carrier 100 together, the first bracket 104 and the second bracket 106 are aligned and connected together. In one embodiment, the release ears 180, 204 are positioned opposite one another such that the edge arm 186 of the first bracket 104 extends parallel to the support arm 200 of the second bracket 106. The shelf 230 of the second bracket 106 is then positioned within the track cavity 170 of the first bracket 104 and the various tangs 164, 166, 232, 250 are received in corresponding tang receptor grooves 168, 234, 236, 251 on the respective bracket 104, 106.

The strengthening plate 252 is positioned against the release wall 174 of the first bracket 104 and the lip 178 sits around the perimeter of the strengthening plate 252. The two pin apertures 138, 222 are aligned with one another. Once the pin apertures 138, 222 are aligned, the release pin 320 is received therethrough and securing connected to the release ear 204 of the second bracket 106, such that a force on the pin 320 will be transmitted to the second bracket 106. In some embodiments, the pin 320 is keyed via the keyed features of the aperture 222 to the release ear 204 and in other instances the pin 320 may be glued, welded, molded, or the like, in order to connect it to the second bracket 106.

After the pin 320 or before the pin 320 is connected, the spring 322 is positioned on the first bracket 104. For example, with reference to FIGS. 6, 7, and 8A, the spring 322 is positioned around the spring post 134 and within the release compartment 132 on the release ear 180 of the first bracket 104. The front ledge 136 and spring post 134 act to capture the spring 322 within the release compartment 132 and prevent lateral movement of the spring 322.

The actuator 310 is then secured to the brackets 104, 106. The pin 322 is positioned within the post aperture 312 of the actuator 310 and extends away from the post 312. It should be noted that in some embodiments, the pin 320 may be secured to the actuator 310 before being inserted through the release ears and in other embodiments, may be secured to the actuator 310 after insertion. The connection mechanism and assembly order of the actuator 310 and the pin may depend on the desired manufacturing process, materials, and the like, and the discussion of any particular order is meant as illustrative only. As shown in FIGS. 6 and 7, the actuator 310 is positioned adjacent but spaced apart from the release compartment 132 and covers the compartment window 143 and the release compartment 132 as viewed from the front of the first bracket 104. The actuator 310 also acts to trap the spring 322 within the spring cavity 314 such that the spring 322 is captured between the release compartment 132 and the rear surface 318 of the actuator 310.

After the actuator 310 is secured to the first bracket 104, the cap 124 is positioned and coupled to the release ear 204 of the second bracket 106. For example, the prong 308 of the cap 124 seats within the detent 224 and the lip 306 of the cap 124 is positioned within the cap trough 176 of the release ear 180 of the first bracket 104. The bottom edge 302 of the cap 124 then follows the top outer edge of the shoulder 226 of the second bracket 106.

With reference to FIGS. 6 and 7, to operate the carrier 100, the user exerts a force F against the outer surface 316 of the actuator 310. When the force exceeds the biasing force exerted by the spring 322, the actuator 310 moves laterally towards the release ear 180 of the first bracket 104, compressing the spring 322 within the release compartment 132. As this occurs, the pin 322 moves with the actuator 310 and transmits the force to the second bracket 106, in particular, the strengthening wall 252 of the second bracket 106. This force causes the second bracket 106 to move in the same direction as the actuator 310, e.g., in a horizontal direction away from the front bracket 104. As this occurs, the top surface 188 of the front bracket 104 separates from the top surface 206 of the second bracket 106 defining a gap therebetween. The shelf 230 spans across the gap and the engagement tangs 164, 166, 232, 250 maintain the connection between the two brackets 104, 106, while also allowing a separation between the two brackets. The strengthening wall 252 provides additional strength for the release ear 204 to absorb the force and repeated opening/closing, without requiring an overall increased thickness or stronger material for the bracket 106. The separation gap or insertion gap between the two brackets 104, 106 may be defined based on a thickness of the mobile device, such that the static gap plus the separation gap is determined by a clearance needed to place the carrier 100 over a top edge (or other edge as desired) of the device. It should be noted that the separation or insertion gap may be defined as the distance traveled by at least one of the brackets during actuation. The two brackets may have an initial separation distance and the insertion or separation gap is the initial distance, plus the moved distance.

Once the force F is removed or otherwise drops below the predetermined threshold of the biasing force of the spring 322, the spring 322 exerts a recovery force against the rear surface 318 of the actuator 310, which causes the actuator 310 to move back towards the initial position, i.e., away from the release ear 180 of the first bracket 104. This, in turn causes the pin 320, which is coupled to the release ear 204 of the second bracket 106, to move correspondingly, moving the second bracket 106 back towards the first bracket 104 and closing the separation gap between the two brackets 104, 106. When the insertion or separation gap is closed, the two brackets may return to the initial separation distance, which is sufficiently close to one another to clamp or engage the surfaces of the mobile device.

Once positioned around the edge of the mobile device 102, the rounded corner edge, e.g., an intersection between a top edge and a bottom edge of the mobile device, is received within a cavity defined by the edge grooves 156, 244 of the brackets 104, 106. The edge grooves 156, 244 have a depth corresponding to a portion of the thickness of the device 102, such that the entire edge is received in the combination of the two grooves 156, 244. For example, each edge groove may have a depth approximately half the thickness of the mobile device. Additionally, the edge grooves may be configured to accommodate additional thicknesses added by protective accessories, such as cases, sleeves, screen protectors, or the like. The engagement surface 160 and rear surface 182 of the front bracket 104 are configured to seat against a first surface, e.g., a front surface, of the mobile device 102 when positioned on the front of the mobile device. The engagement helps to ensure that the carrier 100 remains in place relative to the on-board cameras of the device 102 when secured to the device 102. In embodiments when the front-surface camera (e.g., front facing camera) is positioned on a central top portion of the device, the support arm 142 of the first bracket 104 extends parallel to the top edge of the device and the support window 144 is aligned with the front facing camera. The length of the support arm 142 and the size and shape of the support window 144 depends on the location of the front facing camera and may be varied as needed. For example, in instances where the front facing camera is closer towards one of the side edges, the length of the support arm 142 may be shortened or increased as needed.

With reference to FIG. 2, in some embodiments, the second bracket 106 may be configured to seat against a rear surface of the mobile device 102 and align with a second rear facing camera for the device. In some instances, such as the example shown in FIG. 2, the rear facing camera may be aligned adjacent to and parallel with the side edge of the device 102. In these instances, the support arm 200 of the second bracket 106 extends parallel to the side edge, e.g., downwards from the top edge until the support window 208 is aligned with a camera region of the mobile device 102. The alignment ledge 240 seats around an elevated or raised camera region for the device 102 and engages the rear surface of the mobile device 102. In this manner, the interior surface 238 is spaced apart from the rear surface of the mobile device 102. However, in other embodiments, the second bracket 106 may be differently configured such that the interior surface 238 and/or other surfaces may be engaged with the outer surface of the mobile device.

With reference to FIG. 3B, in some embodiments, the bottom edges of the front and rear brackets 104, 106 are configured to extend around or otherwise correspond to features of the mobile device 102. For example, the bottom walls 158, 254 of the brackets 104, 106 may curve upwards to provide clearance for one or more input buttons included on the side edge of the device 102. In other instances, the brackets may include apertures, cutouts, or the like, that provide clearance for accessing the various input features of the mobile device 102.

Lens Assembly

The lens assembly 120 holds lenses with different optical characteristics and allows the lenses to be easily connected and disconnected from the lens carrier 100 as desired. This allows a user to quickly interchange the lenses that are optically aligned with the on-board cameras without having to remove the entire carrier 100 from the device 100. With reference to FIGS. 11A-12B, the lens assembly 120 may include a lens 330, a lens frame 332, a lens support 336, and one or more latch assemblies which may include a latch 331 and a spring 380, each of which will be discussed in more detail below.

The lens 330 includes an optical lens with select optical characteristics and a support for the lens. The optical characteristics of the lens 330 may be varied as desired and are configured to optically align with and optically enhance lens characteristics of the on-board cameras or other lenses of the mobile device 102.

Figure 11A:
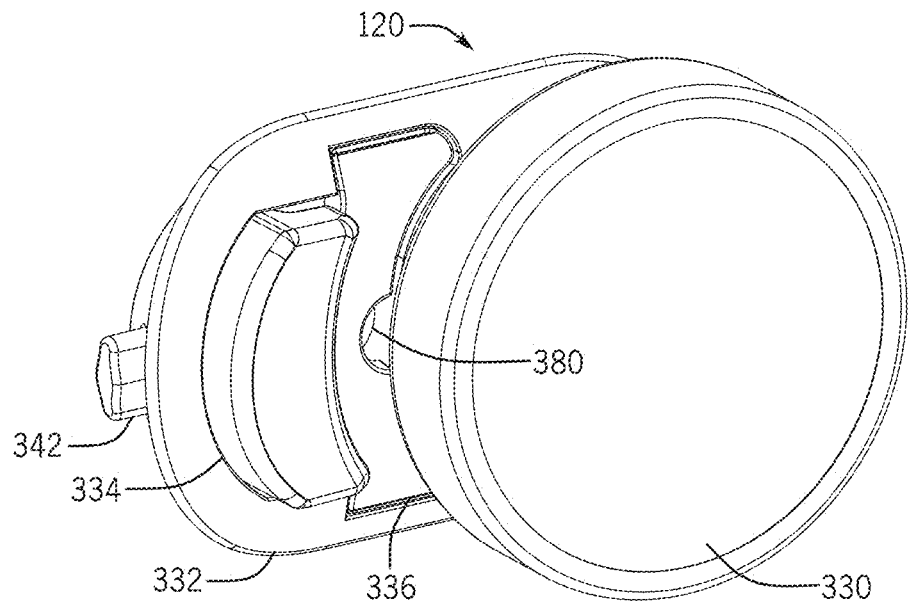
FIG. 11A is a front isometric view of a lens assembly for use with the auxiliary lens carrier of FIG. 1.
Figure 11B:
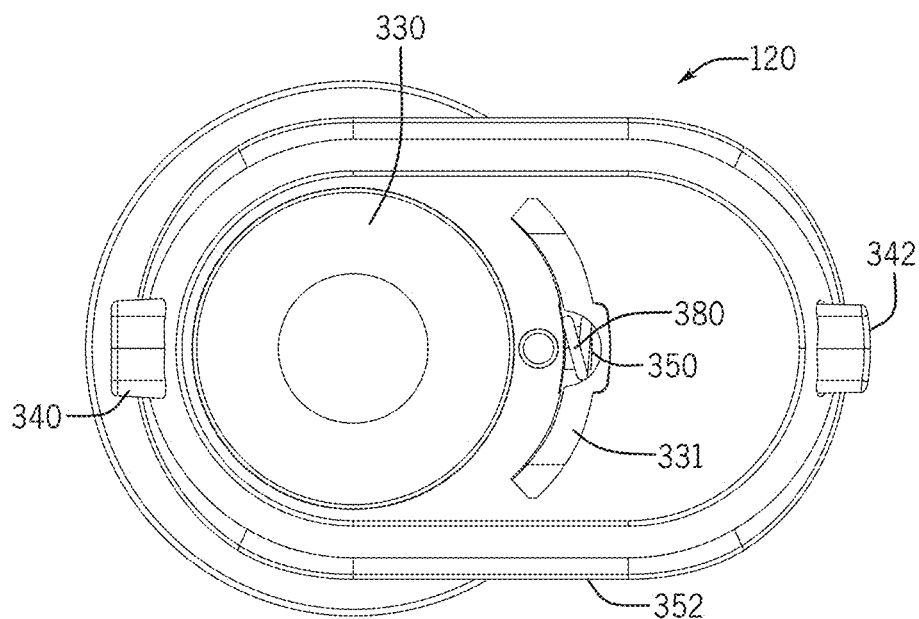
FIG. 11B is a rear elevation view of the lens assembly of FIG. 11A.
Figure 11C:
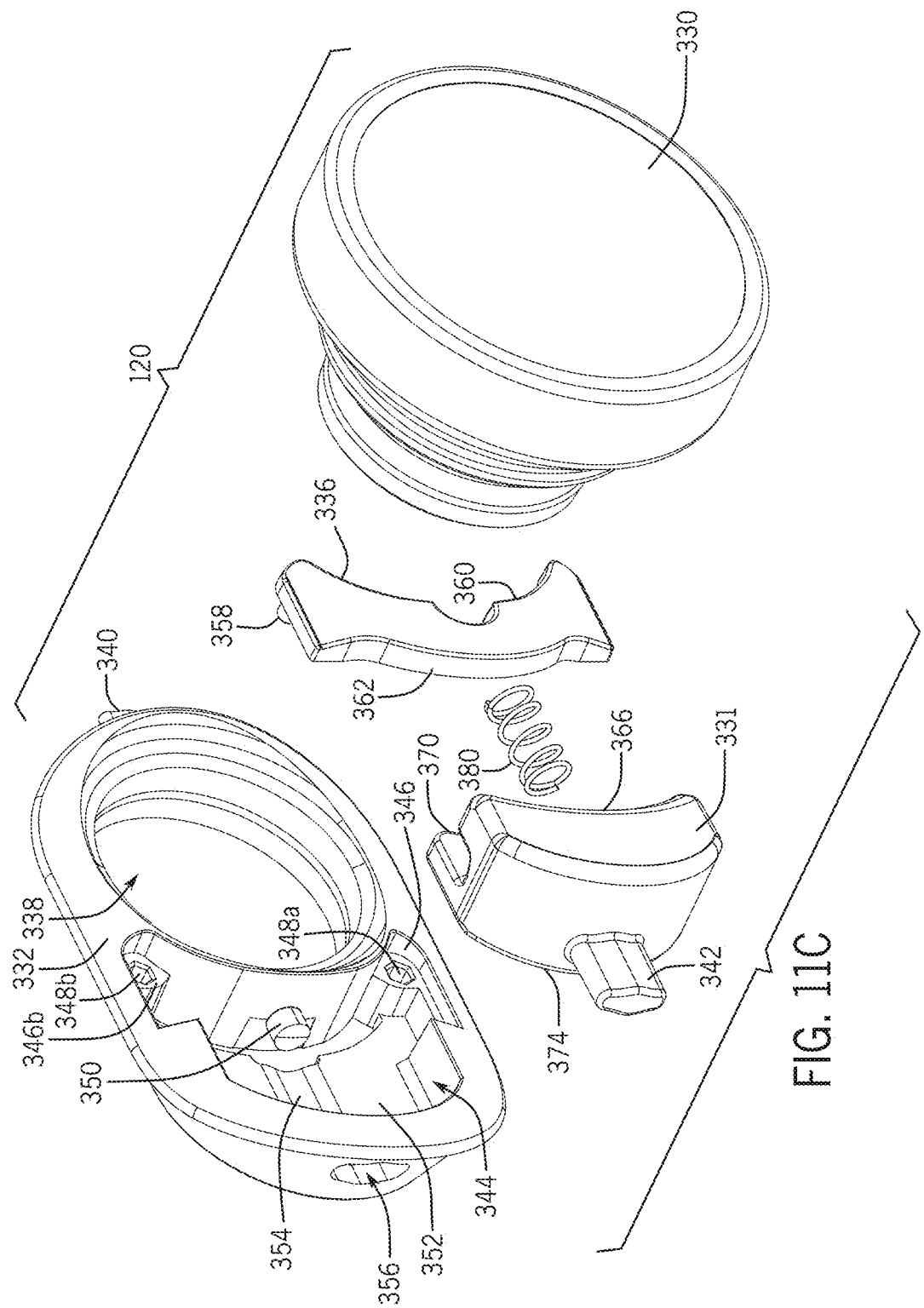
FIG. 11C is an exploded view of the lens assembly of FIG. 11A.

The lens support 336 helps to secure the lens 330 within the lens frame 332 and also acts to easily leverage the lens out of the frame 332. With reference to FIG. 11C, in some embodiment, the lens support 336 includes a front surface, a rear surface, and two edge surfaces forming the peripheral side edges of the support 336. In one example, a latch surface 362 may have convexly curved shape that may be configured to generally match a curvature of the latch engagement surface and the lens surface 360 may have an inwardly curved surface that may be configured to match the curvature of the bottom support of the lens 330. Additionally, the lens surface 360 may include a cutout section formed in a middle area thereof. The lens support 336 may also include one or more prongs 358 extend outwards from a back surface. In one embodiment, the lens support 336 may include a top and bottom prong 358 positioned on top and bottom ends of the back surface and configured to be received in one or more prong compartments on the lens frame as discussed below.

With continued reference to FIG. 11C, the lens frame 332 may be shaped as an elongated oval and include a lens aperture 338 defined through a first section and a lens aperture 344 defined through an adjacent section. The lens aperture 338 may be defined as a circular shaped aperture and configured to receive the lens 330 and in this manner may be sized and shaped to correspond to the lens 330. A catch 340 extends laterally outwards from a first side edge of the lens frame 332 and may be positioned adjacent to the lens aperture 338. The catch 340 may be keyed and include a circular shaped protrusion having tabs extending from each side or other similar features. In some embodiments, a spring post 350 may be defined as a cylindrical post extending in a first direction away from an interior surface of the frame 332. In one embodiment, the spring post 350 may be positioned opposite from the catch 340 and extend in an opposite direction from the catch 340.

Figure 12A:
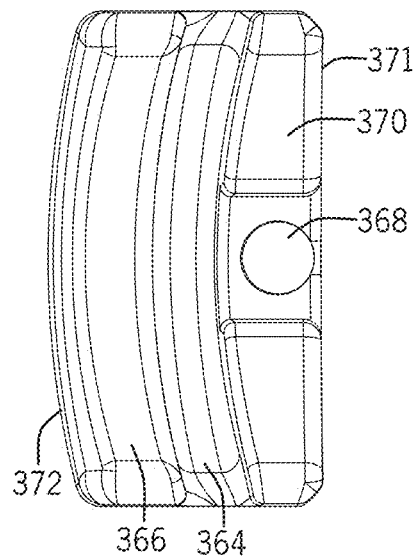
FIG. 12A is a left side elevation view of a latch of the lens assembly of FIG. 11A.
Figure 12B:
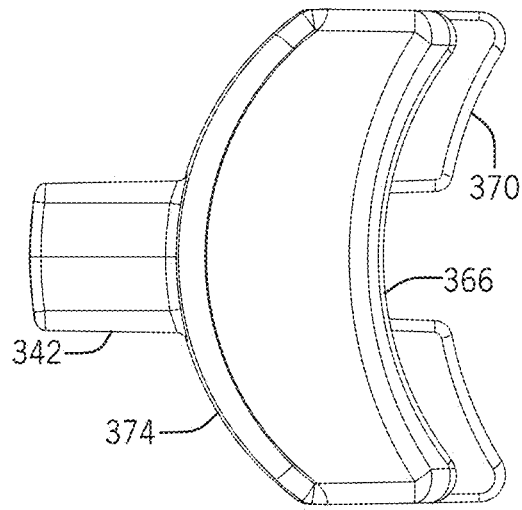
FIG. 12B is a front elevation view of the latch of FIG. 12A.

With continued reference to FIG. 12, the latch aperture 344 extends through a top surface and provides access to a bottom surface 352 of the frame 332. A support edge 346a, 346b is defined on opposite edge corners of the latch aperture 344 and extend partially into the aperture 344. Each support ledge 346a, 346b may define a prong recess 348a, 348b that may be keyed (e.g., include keying features). A track 354 is defined longitudinally across the interior side of the bottom surface 352 and extends laterally across the surface. The track 354 may be aligned with the spring post 350 such that a spring can sit within the track 354 and be aligned with the spring post 350. A catch aperture 356 is defined through a sidewall edge of the lens frame 332 and may be aligned with the track 354.

With reference to FIGS. 12 and 13, the latch 331 may include a front surface 372 and arear surface 371 with a support groove 364 defined on the edge support surface 366 between the two surfaces 371, 372. The support groove 364 extends along the height of the latch 331 and may be curved as it extends along its height. The rear surface 371 is split into two sections that each form an interior wall 370 of the latch 331. A spring post 368 may be positioned between the two interior wall 370 sections and a catch 342 may be formed on the exterior sidewall of the latch 331.

With reference to FIGS. 11A-12B, to assemble the lens assembly 120, the spring 380 is positioned around the spring post 350 on the lens frame 332 and positioned within the track 354. The opposite end of the spring 380 is then positioned around the spring post 368 on the latch 331. The catch 342 of the latch 331 is inserted into and extends out of the catch aperture 356 of the lens frame 332. The spring 380 then extends across the bottom surface 352 of the frame 332 between the latch 331 and the outer edge of the lens aperture 338 perimeter surface. The lens support 336 is then positioned over the spring 380 and the prongs 358 are positioned into the prong recesses 348a, 348b on the lens frame 332, securing the lens support 336 in position. The lens 330 is positioned within the lens aperture 338 and extends from the front to the rear surface of the frame 332. Once secured in position, the lens 330 and the lens support 336 may be prevented from movement to ensure that the lens 330 and the spring 380 will remain in position during movement of the frame 332, such as during use on the mobile device 102 or the like.

In operation, a force exerted on the catch 342 of the latch 331, causes the latch 331 to compress the spring 380 and translate across the latch aperture 344, to move the catch 342 inwards towards an opposite wall of the lens frame. This movement allows the lens assembly 120 to latch and unlatch from the first or second brackets 104, 106 of the auxiliary lens carrier 100. For example, with reference to FIGS. 8A, 11A, and 11B, to insert the lens assembly 120 into the front bracket 104, a user angles the immovable catch 340 formed integrally with the lens frame 332 with the securing aperture 150b on the interior wall 148 of the support arm 142 of the first bracket 104. The catch 340 is then positioned in the securing aperture 150b and the lens frame 332 is aligned with the support window 144 and the latch 331 is compressed to move the movable catch 342 inwards. This movement causes the lens frame 332 to seat within the support window 144 and be positioned within the interior wall 148. Once the movable catch 342 aligns with the securing aperture 150a, the latch 331 is released and the spring 380 forces the catch 342 outwards by movement of the latch 331, and the catch 342 extends into the securing aperture 150a, securing the lens frame 332 to the support arm 142. A similar attachment procedure may be used to secure lens assembly 120 to the rear bracket 106 and the securing apertures 214a, 214b act to receive the catches 340, 342 of the lens assembly 120.

ALTERNATIVE EMBODIMENTS

As noted above, the lens carrier can be modified depending on the location, configuration, and dimensions of the on-board cameras of the mobile device, as well as the desired accessories to be attached to the device via the lens carrier. FIGS. 13A-24 illustrate alternative examples of lens carriers for different mobile device configurations. It should be noted that the lens carriers of FIGS. 13A-24 may be used with the lens assembly 120 or may be used with permanently attached or different removable lens configurations.

FIGS. 13A-20 illustrate a first example of a lens carrier for use with multiple mobile device configurations, such as ones including centrally located on-board cameras on the front and/or rear surfaces. The lens carrier 400 is attachable to an electronic mobile device 402 with one or more cameras or optical elements. The lens carrier 400 may be substantially similar to the lens carrier 100, but in some instances, may be configured to support a single accessory and be centrally located on a top surface of the mobile device 402. The lens carrier 400 may include a release assembly 424 that actuates movement of at least one of a front bracket 404 relative to the rear bracket 406, each of which are discussed in turn below. The configuration of the lens carrier 400 may allow the carrier to connect with an optically align with a number of different mobile devices, as compared to a more specific carrier configured to match with the profile of a single type of mobile device.

With reference to FIGS. 19A-19C, the first bracket 404 may be substantially similar to the first bracket 104 and include a support arm 440 extending from a top surface 446. In one example, the support arm 440 may be formed in a tapered V or U shaped that tapers from the top surface 446 towards a bottom surface. Additionally, in some instances, the support arm 440 may not include a support window or other element to which an auxiliary lens may attach or may include a support window similar to the one in the second bracket 406. A front surface 442 of the support arm 440 may include an actuator surface 444 extending outwards from the front surface 442 at a top end of the bracket 406. The actuator surface 444 may also extend upwards from the top surface 446 to define an elevated surface above the top surface 446 of the support arm 440 and may define a biasing cavity 452. The biasing cavity 452 may be formed as an oval shaped cavity or recess extending through a portion of the width of the bracket 404. The depth of the biasing cavity 452 may be based on a desired movement amount of the second bracket relative to the front bracket. In some embodiments, the depth may correspond to a thickness of the mobile device 402. One or more pin apertures 448a, 448b, 448c may be formed through the front surface 442 to the rear surface 452 of the support arm 440.

With reference to FIG. 19B, the rear surface 452 of the first bracket 404 may include a structural shoulder 454 extending outwards therefrom on the top end of the bracket 404. The structural shoulder 454 may have an increased width as compared to the remaining sections of the bracket 404 and be aligned with the pin apertures 448a, 448b, 448c so as to provide increased structural support for the bracket 404 at the locations of the apertures. Additionally, one or more guide pins 450a, 450b or guide features may extend outwards from the exterior surface of the shoulder 454.

Figure 17:
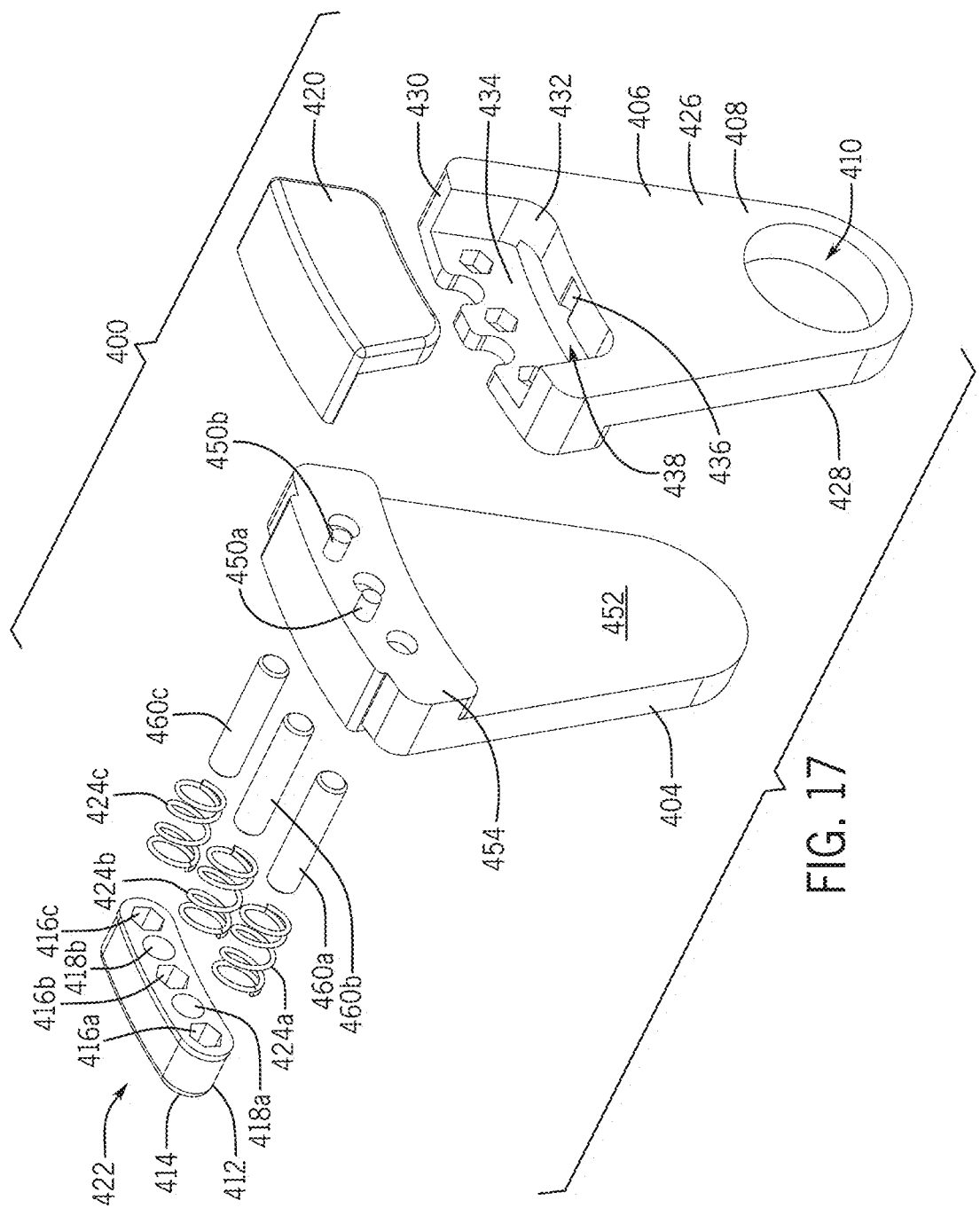
FIG. 17 is an exploded view of the auxiliary lens carrier of FIG. 13A.
Figure 18:
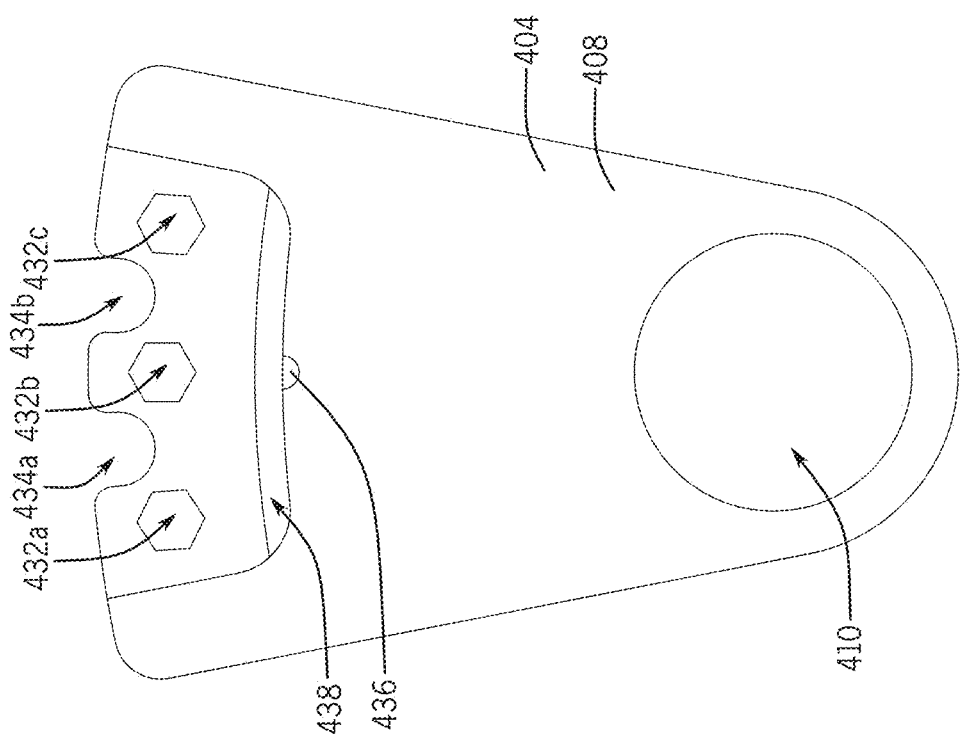
FIG. 18 is a rear elevation view of a first bracket of the auxiliary lens carrier of FIG. 13A.
Figure 22:
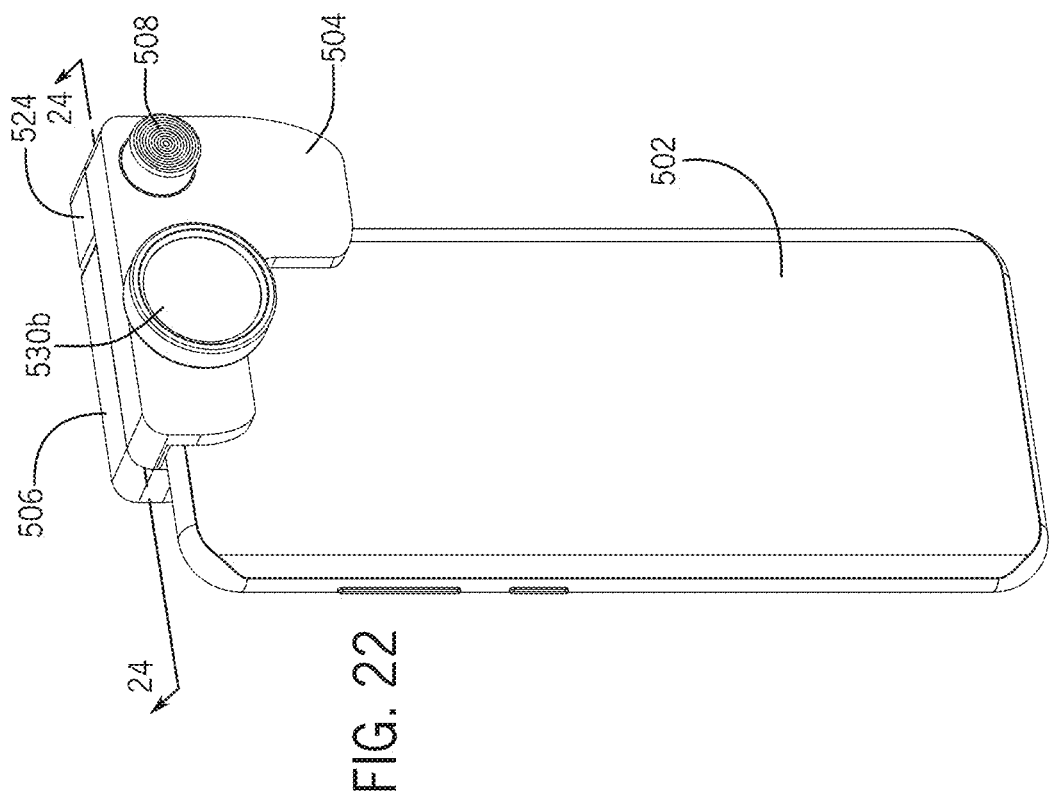
FIG. 22 is a rear isometric view of the auxiliary lens carrier and mobile device of FIG. 21.
Figure 21:
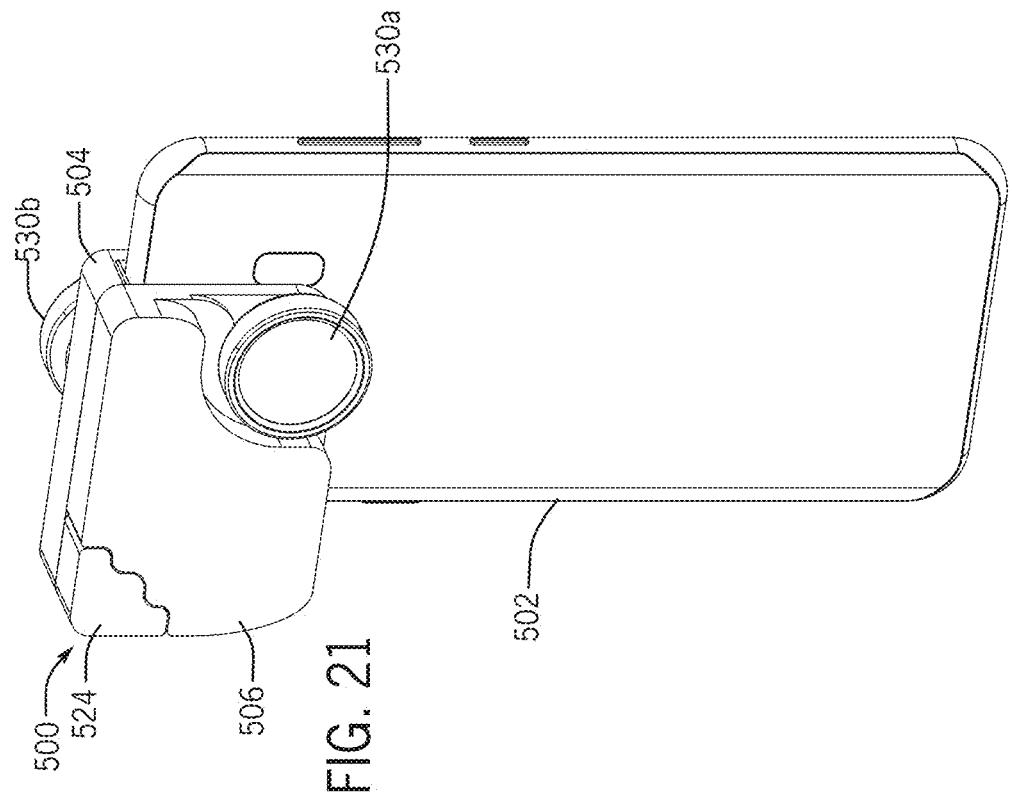
FIG. 21 is a front isometric view of another example of an auxiliary lens carrier attached to another example of a mobile device.
Figure 23:
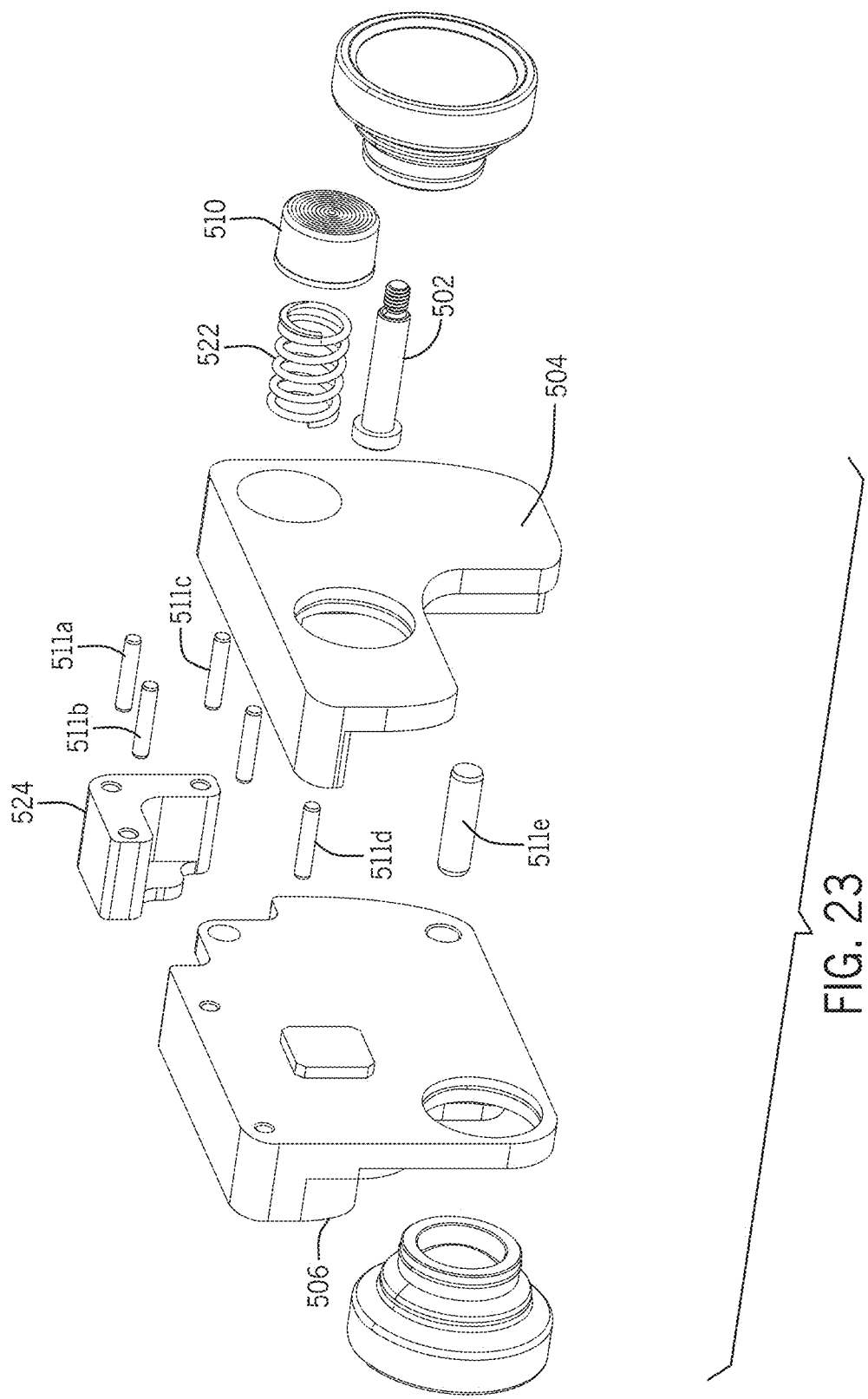
FIG. 23 is an exploded view of the auxiliary lens carrier of FIG. 21.
Figure 24:
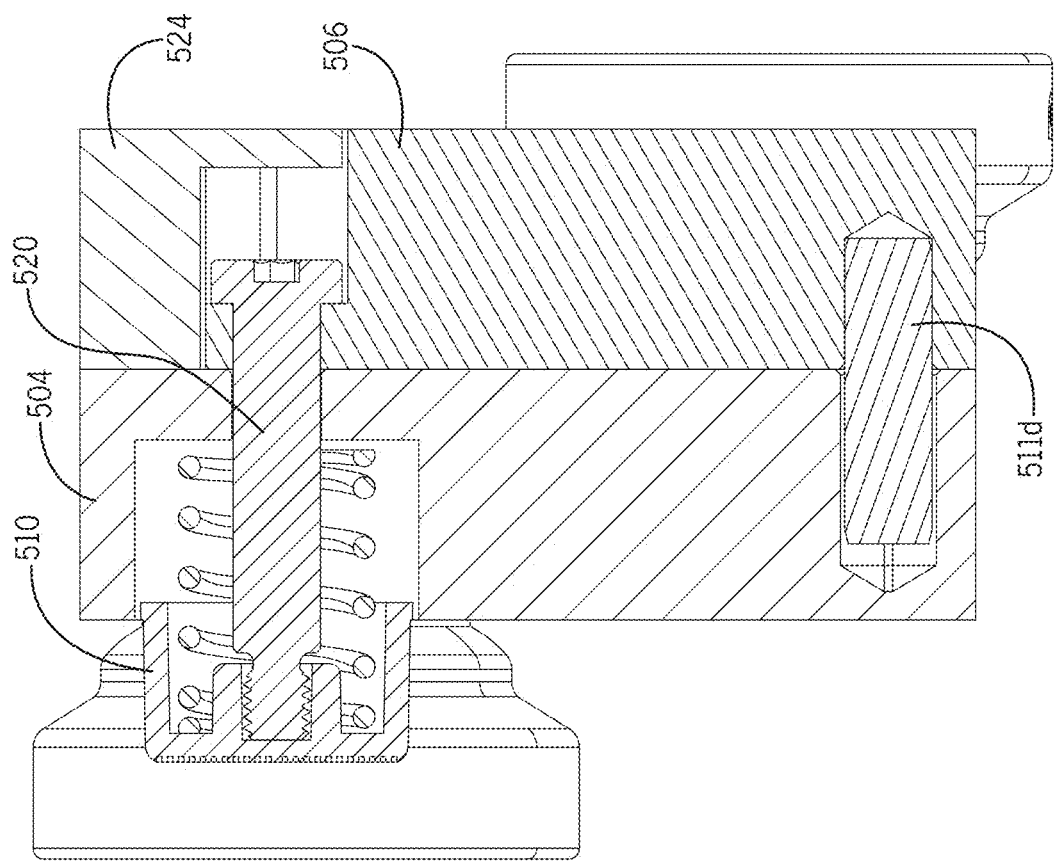
FIG. 24 is a cross-section view of the auxiliary lens carrier of FIG. 21 taken along line 24-24 in FIG. 21.
Figure 25A:
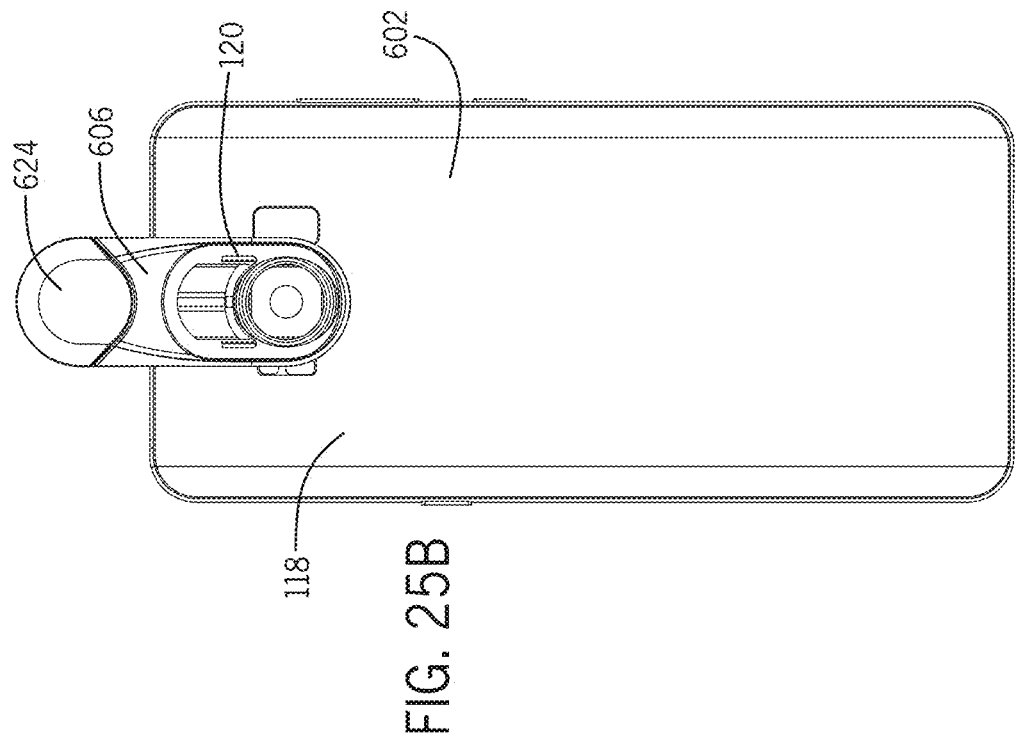
FIG. 25A is a front isometric view of another example of an auxiliary lens carrier attached to a mobile device.
Figure 25B:
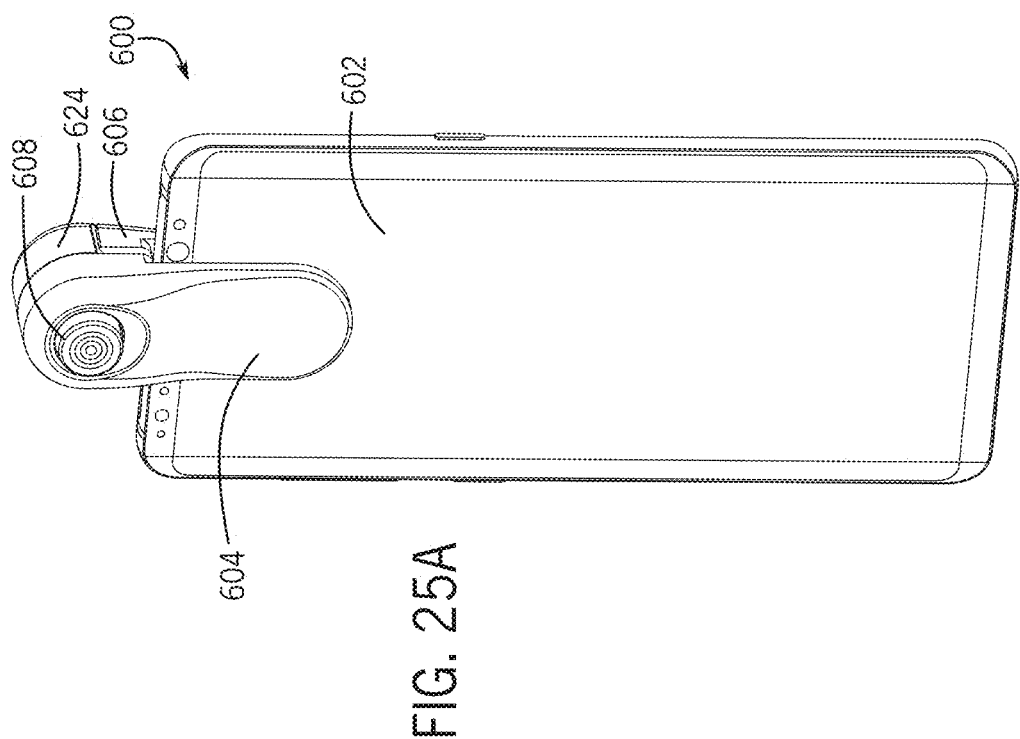
FIG. 25B is a rear elevation view of the auxiliary lens carrier and mobile device of FIG. 25.
Figure 29:
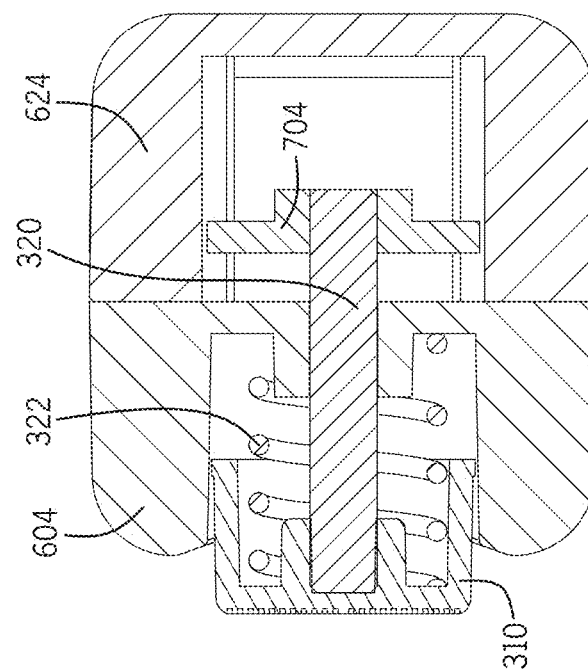
FIG. 29 is another cross-section view of the auxiliary lens carrier of FIG. 25A.
Figure 28:
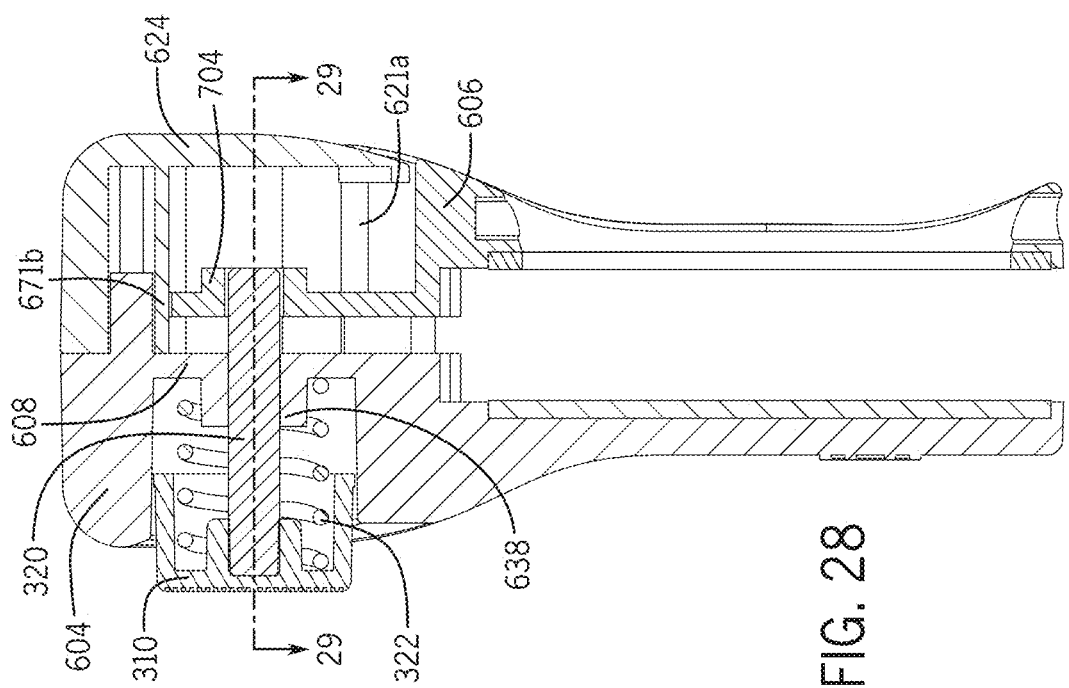
FIG. 28 is a cross-section view of the auxiliary lens carrier of FIG. 25A.

The second bracket 406 may be substantially similar to bracket 106 and may include a support arm 408 forming a supporting body for an auxiliary accessory, such as a lens or a lens assembly. With reference to FIGS. 17 and 18, in one example, the support arm 408 is formed as a U or V shaped body that tapers inwards as it extends from a top surface 430 towards a bottom end. The length of the support arm 408 may be selected based on the distance of the on-board camera on the mobile device 402 from the top surface or other support edge of the mobile device 402 to which the carrier 400 will be engaged. The bottom end of the support arm 408 defines a support window 410 that extends from the front surface 426 to a rear surface 428. In embodiments where the support arm 408 may be attached permanently to a lens, the support window 410 may be formed as a circular aperture to directly correspond to the shape of the lens 330, but in other examples may be configured to receive removable lenses, such as the lens assembly 120 and in these instances may include keyed or connective features, such as catches, to releasably connect the lens to the bracket 406.

With continued reference to FIGS. 17 and 18, a shoulder 432 is formed as a surface recessed below the top level of the top surface 430 on a top end of the bracket 406, e.g., as a stepped down surface. The shoulder 432 may include on or more cap grooves 436 defined on its top surface and forms an engagement structure to support the cap of the release assembly as discussed below. A release ear 434 may extend outwards from a top end of the rear surface 428 and span the width of the bracket 406 from edge to edge. In on example, the release ear 434, which may be formed as a wall, may have a top surface coextensive with the top surface 430 of the support arm 408, but terminate at a depth shorter from the top surface 430 than a depth of the top surface of the shoulder 432. In this manner a gap 438 is formed between the bottom surface of the release ear 434 and the top surface of the shoulder 432. However, in other embodiments, the release ear 434 may be differently configured and the gap 438 may be omitted or differently configured The top surface of the release arm 434 may include one or more guide grooves 434a, 434b formed as circular dips or grooves and spaced apart from one another. Additionally, one or more keyed apertures 432a, 432b, 432c may be formed through the release arm 434. In one example, the keyed apertures 432a, 432b, 432c may be keyed with a hexagonal shape, but in other embodiments may include other shapes or keying structures or in instances where the pins may be secured in manners other than a keyed fit may omit the keying structure.

Figure 20:
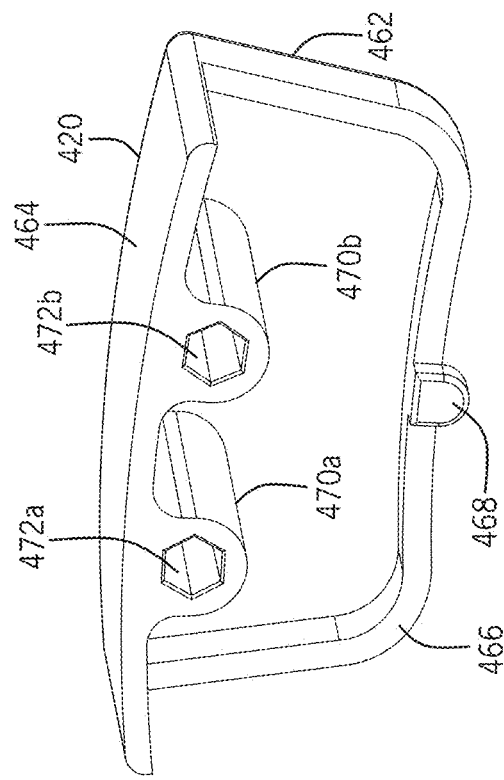
FIG. 20 is a rear isometric view of a cap for a release assembly of the auxiliary lens carrier of FIG. 13A.

With reference again to FIG. 17, the release assembly 422 may be substantially similar to the release assembly 108. For example, the release assembly 422 may include a support cap 420, an actuator 412, one or more rigid members 460a, 460b, 460c, and one or more biasing elements 424a, 424b, 424c. With reference to FIGS. 17 and 20, the cap 420 may be similar to the cap 124 and act to assist a user in actuating the release by providing additional leverage. In this example, the cap 420 may be formed in a rectangular shape body and may include a top ledge 464 forming a top surface of the cap 420. The cap 420 may transition from a first plane defining an exterior surface 462 to a second plane perpendicular to the exterior surface 462. One or more guide pockets 470a, 470b may formed as a cylindrical posts extending downwards from the interior surface of the top ledge 464. Each of the guide pockets 470a, 470b may include a keyed or other shaped cavity 472a, 472b therein. With reference to FIG. 20, the rear or interior surface of the cap 420 may include a raised lip 466 around a portion of the perimeter, as well as a tang 468 extending downwards form the lip 466 and positioned in the center of the bottom edge of the cap 420.

With reference again to FIGS. 13A and 17, the actuator 412 may be substantially similar to the actuator 310 of the release assembly 122. However, in some instances, the actuator 412 may be formed as an elongated member shaped in a slightly curved oval manner. The elongated rectangular or oval shape of the actuator 412 may provide an extended length actuator surface 414 for a user to engage and may correspond to a shape of the cutout 452 of the first bracket 404. One or more cavities may be formed on the rear surface of the actuator 412. In one embodiment, three keyed cavities 416a, 416b, 416c may be formed having keying features and be spaced across the rear surface. Additionally, one or more guide cavities 418a, 418b may be formed in a similar manner, with the guide cavities 418a, 418b alternating between the keyed cavities 416a, 416b, 416c.

With reference to FIG. 17, the rigid members 460a, 460b, 460c may be formed as pins, posts, or other extension elements and may be formed of a rigid material, such as a metal or alloy. The rigid members 460a, 460b, 460c act to transfer force from the actuator 412 to the movable bracket 408 and therefore may be formed of an incompressible material to ensure a majority of the force is transmitted as desired.

The one or more biasing members 424a, 424b, 424c may be formed as coil springs or other spring or biasing materials or configurations. In some embodiments, there may be three biasing members 424a, 424c, 424c to ensure that the actuator 412 is biased evenly. However, in other configurations, other types and numbers of biasing members can be used.

To assemble the lens carrier 400, the first and second brackets 404, 406 are aligned with one another. The guide pins 450a, 450b of the first bracket 404 are aligned within the guide grooves 434a, 434b of the second bracket 406. The rigid members 460a, 460b, 460c are asserted into the pin apertures 448a, 448b, 448c of the first bracket 404 and through the keyed apertures 432a, 432b, 432c of the second bracket. The rigid members 460a, 460n, 460c are secured to the keyed apertures 432a, 432b, 432c, such that movement of the rigid members 460a, 460b, 460c causes the second bracket 406 to move correspondingly. In some embodiments, the rigid members 460a, 460b, 460c may be glued, welded, key fit, friction fit, or the like to the second bracket 406, but other types of secured attachment may be used.

The biasing elements 424a, 424b, 424c may be positioned around each of the rigid members 460a, 460b, 460c and positioned within the biasing cavity 452. The exposed ends of the rigid members 460a, 460b, 460c may then be captured within the keyed cavities 416a, 416b, 416c of the actuator 412. The rigid members 460a, 460b, 460c may be secured to the actuator 412 and movement of the actuator 412 will thus be transmitted to movement of the rigid members 460a, 460b, 460c and the second bracket 406. The rigid members may be connected to the actuator 412 in a manner similar to the attachment to the second bracket 406. The actuator 412 may then partially seat within the biasing cavity 452 and be configured to translate from a first or initial position to a second or actuated position.

Once the actuator 412 is secured, the support cap 420 may be seated within the shoulder 432 of the second bracket 406 with the lip 466 positioned over the top surface of the shoulder 432 and the tang 468 seated within the cap groove 436 of the shoulder 432. The cap ledge 464 extends over the recessed shoulder 432 and sits on the top surface of the release arm 434. The posts 450a, 450b of the first bracket 404 are received within the post cavities 472a, 472b of the cap 420 and the guide pockets 470a, 470b of the cap 420 positioned within the guide grooves 434a, 434b, 434c. The connection between the posts 450a, 450b and the cap 420 helps to secure the cap 420 to the first bracket 404, as well as define a track for movement of the second bracket 406 relative to the first bracket 404. The top surface of the cap 420 is configured be aligned with the elevated top surface of the raised actuator surface 444 of the first bracket 404 and the cap 420 is raised above the top surface 430 of the second bracket 406. Before use, one or more lenses 330 may be positioned within the support window 410 of the support arm 408 of the bracket 404.

With reference to FIGS. 15 and 16, in operation, a user exerts a force on the actuator surface 414 of the actuator 412, e.g., a perpendicular force to the actuator surface 414. Once the user force exceeds a combined biasing force of the biasing members 424a, 424b, 424b, the biasing members 424a, 424b, 424c compress, causing the actuator 412 to move inwards into the biasing cavity 452 of the immovable first bracket 404. As this occurs, the rigid members 460a, 460b, 460c are moved by their secured connection to the actuator 412. The movement of the rigid member 460a, 460b, 460c causes the second bracket or movable bracket 406 to move correspondingly. The movement of the second bracket 406 may be constrained to a motion perpendicular to the extension direction of the support arm 408, such that the two brackets 404, 406 remain parallel to one another along the entire movement path. This movement causes a separation gap 480 between the two brackets 404, 406 to increase, the increase being defined by the movement of the actuator 412 relative to the front bracket 404. This increased gap 480 then allows a user to position the two brackets 404, 406 on opposing sides of the mobile device 402. Once the clip 400 is positioned over the edge of the mobile device 402, the user releases the actuator 412. Release of the actuator 412 (or other decrease in the user force below the combination biasing threshold force), causes the biasing members 424a, 424b, 424c to decompress and expand. As the biasing members 424a, 424b, 424c expand, they exert an opposite movement force on the actuator 412, causing the actuator 412 to move away from the first bracket 404 and extend back out of the biasing cavity 452. The return movement of the actuator 412 may be directly opposite the actuating movement.

With reference to FIGS. 21-24, another example of a carrier 500 is shown. In this embodiment, the carrier 500 may be substantially similar to the carrier 100 shown in FIG. 1, but include modified support arms on the brackets to match a positioning location of the on-board cameras for the mobile device 502. Additionally, the carrier 500 may include one more guide members 511a, 511b, 511c, 511d formed separately from the brackets 504, 506. In particular, the carrier 500 includes a first or stationary bracket 504, a second movable bracket 506, a release assembly 508, and the one or more guide members 511a, 511b, 511c, 511d. One or more lenses 530a, 530b or lens assemblies may be connected to the brackets 504, 506. The guide members 511a, 511b, 511c, 511d may be formed as rigid pins or posts that are received in corresponding cavities in each of the brackets 504, 506 and define or limit the movement of the movable bracket relative to the stationary bracket.

The release assembly 508 may be substantially similar to the release assembly 108. In one example, the release assembly 508 includes an actuator 510, a rigid member 520, a biasing member 522, and a cap 524, each of which are similar to the counterparts in the release assembly 108. However, in some embodiments, the rigid member 520 may include securing features, such as threads or a head or both one each end to secure the member 520 to the actuator 510 and the cap 524.

FIGS. 25A-33C illustrate another example of the auxiliary lens carrier 600 in accordance with the present disclosure. The carrier may be substantially similar to the carriers shown in the other drawings and any features not specially mentioned may be considered to be substantially the same as in the other examples. In the example of FIGS. 25A-33C, the carrier 600 may include two movable brackets 604, 606 that move along a linear path to separate and clamp together to secure to the mobile device 602. In this embodiment, one bracket may include the lens support, whereas the other bracket may not support a lens or lens assembly. However, in other instances, the brackets may be differently configured. Additionally, the brackets 604, 606 may have an extension direction that extends substantially vertically relative to a longitudinal length of the mobile device 602, such that when connected, can be positionable at a variety of locations on the mobile device 602. This configuration allows the carrier 600 to be more easily attached to multiple types of mobile devices, without being individually tailored to a specific camera and/or corner configuration. In other words, because the length of the support arm extends vertically, the carrier 600 can be positioned at substantially any location of the top edge of the mobile device and therefore may be more easily aligned with the on-board camera(s) of multiple devices, rather than having a lateral extension distance that matches a specific mobile device on-board camera location.

In addition to the brackets 604, 606, the carrier 600 may also include a cap 624, and a release assembly 608. The release assembly 608 and the cap 624 may be substantially the same as the release assembly 108 and cap 124.

With reference to FIGS. 27, 30, and 31, the first bracket 604 will now be discussed. The first bracket 604 may be configured to attach to a front facing side of the mobile device 602 and may or may not include a lens supporting aperture, depending on the desired number of lenses for the carrier 600. In one example, the first bracket 604 may be formed as an elongated generally oval shaped body having an engagement surface 615 and a front surface 617. A support ear 608 may be formed as at the top area of the support body 642 and in some instances may have an increased thickness or width as compared to the other areas of the bracket 604. For example, the width of the support bracket 604 may taper at the bottom edge of the support ear 608 as it transitions towards a bottom end of the bracket 604. The support ear 608 may include a pin aperture 638 defined through a central region thereof. Additionally, the interior surface of the support ear 608 may include one or more guide posts 672a, 672b, 672c, which may be formed as posts, tracks, shelves, of the like, that help to define the motion track for the brackets as they extend away from one another. Additionally, an engagement lip 643 defining an edge groove may be defined at the bottom of the ear 608 and an inflection point for the bracket 604. The lip 634 and groove may be used to capture the top edge of the mobile device 602 and as such the groove may have an interior curvature tracking with the curvature of the mobile device.

With reference to FIGS. 32A and 32B, the cap 624 may include an exterior surface 625 and an interior surface 627 and be shaped as a generally circular body having a curved bottom wall 623. A top wall 629 extends from the interior surface 627 to form a canopy or cover for a portion of the perimeter of the cap 624. The top wall 629 may include material that extends radially inwards towards the center of the cap 624 and may be used to form one or more guide receptors 621a, 621b, 621c that may include keyed apertures for receiving the guide posts 671, 671b, 672c of the ear 698.

Figure 33C:
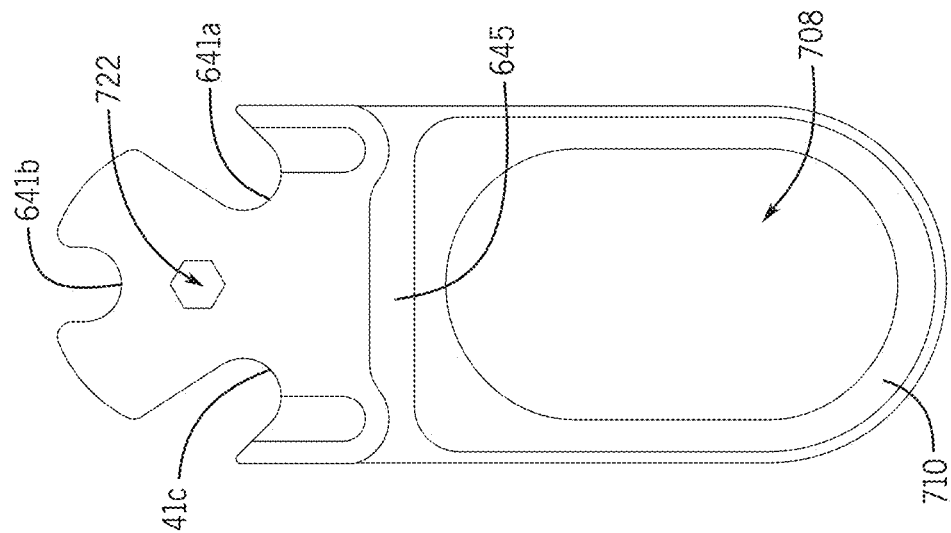
FIG. 33C is a rear elevation view of the second bracket of FIG. 33A.
Figure 33B:
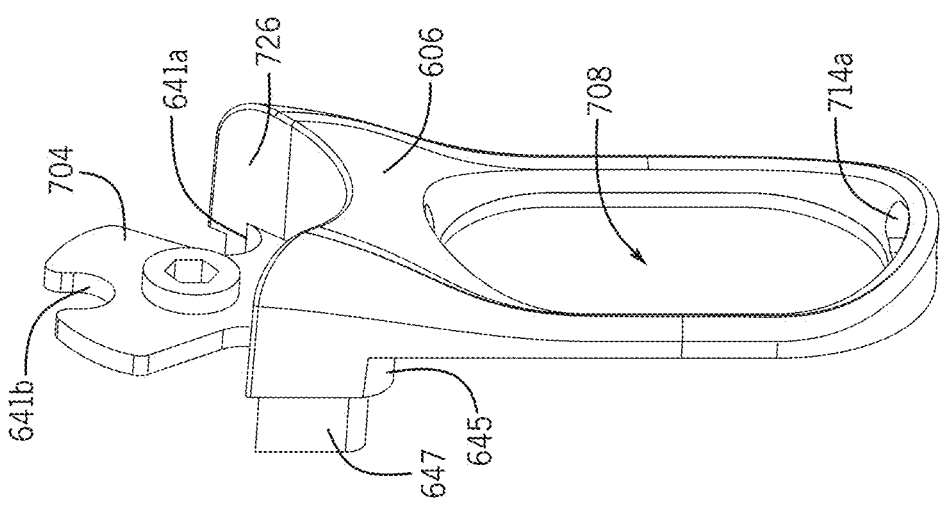
FIG. 33B is a side isometric view of the second bracket of FIG. 33A.
Figure 33A:
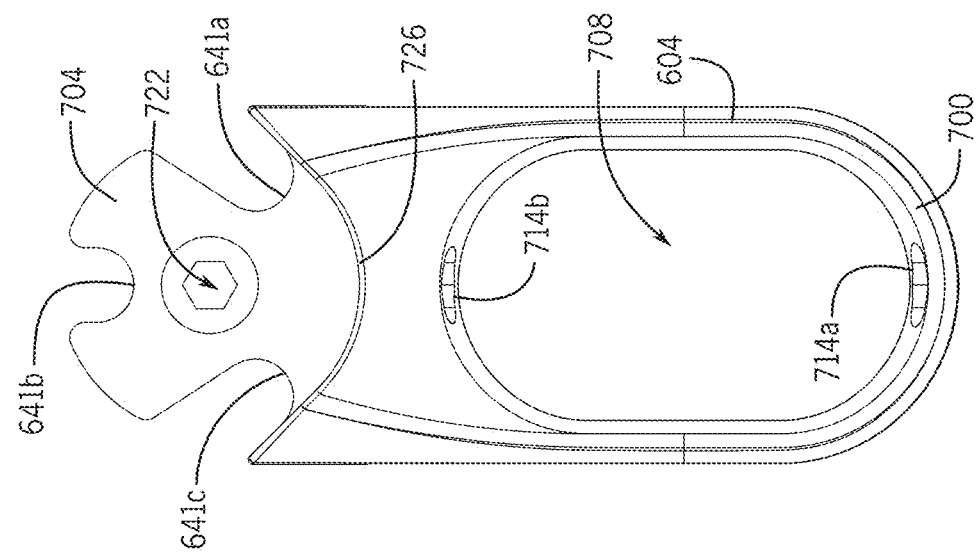
FIG. 33A is a front elevation view of a second bracket of the auxiliary lens carrier of FIG. 25A.

With reference to FIGS. 33A-33C, the second bracket 606 will now be discussed in more detail. The second bracket 606 may be formed in a similar manner as the first bracket 604 and be shaped as an elongated oval body. However, the second bracket 606 may include a lens support aperture 708 defined therethrough. In a specific example, the lens support aperture 708 may be defined as an oval shaped aperture through the support arm 710 of the bracket 606 and be configured to receive the lens assembly 120, 122. The top end of the support arm 610 transitions to form the top end of the bracket and the release ear 704. An interior wall of the support arm 610 may include lens apertures 714a, 714b at opposing ends, e.g., top and bottom ends of the interior wall defining the lens aperture 708. An extension shelf 645 may extend outwards from a back surface of the bracket 606 between the top end of the support arm 610 and the release ear 704. In one example, a secondary shelf 647 may extend from the shelf 645 may form a guide track or the like for connecting with the bracket 604. The extension shelf 645 is configured to sit on a top surface of the mobile device 602 and may include a bottom surface curved to match the curvature of the mobile device.

The release ear 704 may be formed as a thin wall extending upwards from a top shelf 726 formed the top end of the support arm 610. The release arm 704 may be positioned in a middle area of the top shelf 726 or shoulder and the extension shelf 645. In some embodiments, the release earl 704 may include circular or U shaped cutouts 641a, 641b, 641c positioned on a top surface and two opposing edges of the perimeter of the release ear 704. A pin aperture 722 may be defined through a center of the release ear 704 and may be keyed or otherwise configured to secure the pin of the release assembly 608. Additionally, a lip may surround the pin aperture 722 on a front side of the release ear 704.

Assembly of the carrier 600 will now be discussed. In one example, the two brackets 604, 606 are aligned with one another and the guide posts 671*a*, 671*b*, 671*c* are positioned within the cutout grooves 641*a*, 641*b*, 641*c* of the release ear 704 of the second bracket 606. The pin 320 is received through the pin apertures 638, 722 of the release ears 608, 704 and anchored to the release ear 704 of the second bracket 606. The cap 624 is then positioned on the top shelf 726 of the second bracket 606 and the guide apertures 621*a*, 621*b*, 621*c*, each receive a respective guide post 671*a*, 671*b*, 671*c*. The cap 624 is secured to the first bracket 604 via the guide post connection to the guide apertures.

The release assembly 608 is then connected to the first bracket 604 in a similar manner as the release assembly 108. In particular the spring is received around the post surrounding the pin aperture 638 and the button 310 captures the spring 322 within the biasing compartment.

Operation of the carrier 600 is substantially the same as the carrier 100. For example, the user compresses the button 310, which in turn compresses the spring 322, allowing the button 310 to move laterally relative to the first bracket 604 and into the spring compartment. The rigid pin 320 transfers this force to the second bracket 606, causing the second bracket 606 to move away from the first bracket 604, increasing a distance between the two brackets 604, 606, allowing the mobile device 602 to be positioned therebetween. Once the carrier 600 is positioned as desired, the user releases the button 310, the spring 322 biases the button and the pin 320 (which is connected to the button 310), back outwards from the first bracket 604. The connection of the pin 320 to the second bracket 606, cause the second bracket 606 to move laterally towards the first bracket 604, reducing the gap between the two, and clamping the brackets around the two surfaces of the mobile device 602.

CONCLUSION

The above specifications, examples, and data provide a complete description of the structure and use of exemplary embodiments of the invention as defined in the claims. Although various embodiments of the disclosure have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as only illustrative of particular embodiments and not limiting. Changes in detail or structure may be made without departing from the basic elements of the invention as defined in the following claims.

What is claimed is:

1. An auxiliary lens assembly for releasably connecting one or more auxiliary lenses to an electronic device with at least one on board camera, comprising:
    a first bracket;
    a second bracket movably coupled to the first bracket; and
    a release assembly coupled to the first and second brackets, the release assembly comprising:
        an actuator operably connected to the first bracket and configured to receive a user force; and
        a pin that is an elongated member having a first pin end fixed to the actuator and a second pin end fixed to the second bracket, the pin extending through the first bracket, wherein
    in response to the user force, the actuator causes the pin to move the second bracket in a first direction away from the first bracket to increase a separation between the first bracket and the second bracket from an initial position to an expanded position; and
    in response to the user force being removed, the pin moves the second bracket in a second direction towards the first bracket to the initial position from the expanded position.

2. The auxiliary lens assembly of claim 1, further comprising a first lens carrier assembly connected to at least one of the first bracket or the second bracket, the first lens carrier assembly comprising:
    a lens frame;
    a lens connected to the lens frame; and
    a latch assembly connected to the lens frame, the latch assembly movable between a first position and a second position.

3. The auxiliary lens assembly of claim 1, wherein the release assembly further comprises a spring coupled to the actuator, wherein:
    in response to the actuator being actuated by the user force, the spring compresses in an amount corresponding to the separation; and
    in response to the user force being removed from the actuator, the spring expands, thereby exerting a return force on the actuator.

4. The auxiliary lens assembly of claim 1, wherein
    the first bracket comprises a first support arm configured to support a first lens; and
    the second bracket comprises a second support arm configured to support a second lens.

5. The auxiliary lens assembly of claim 4, wherein
    the first support arm comprises a first release ear; and
    the second support arm comprises a second release ear; wherein
    the release assembly couples to the first release ear and the second release ear to actuate movement of the second bracket relative to the first bracket.

6. The auxiliary lens assembly of claim 1, wherein the first bracket is stationary and the second bracket moves to transition to the expanded position.

7. An accessory clip for mobile devices, comprising:
    a stationary bracket configured to engage a first side of the mobile device;
    a movable bracket configured to engage a second side of the mobile device, the movable bracket coupled to the stationary bracket; and
    a release assembly coupled to the stationary bracket and the movable bracket, the release assembly comprising:
        an actuator configured to receive a user force along an actuation direction; and
        a pin that transmits the user force to the movable bracket to push the movable bracket from a clamped position to a release position along the actuation direction, and pull the movable bracket from the release position to the clamped position in a direction parallel to but opposite the actuation direction when the user force ceases; and
        a spring configured to exert a return force that causes the pin member to pull the movable bracket from the release position to the clamped position, wherein:

the pin is an elongated member having a first pin end and a second pin end opposing the first pin end;

the actuator is fixed to the pin at the first pin end;

the moveable bracket is fixed to the pin at the second pin end; and the stationary bracket is arranged substantially between the moveable bracket and the actuator.

8. The accessory clip of claim 7, wherein the movable bracket remains parallel to the stationary bracket as the movable bracket translates between the release position and the clamped position.

9. The accessory clip of claim 7, the pin is keyed to the button and to the movable bracket.

10. The accessory clip of claim 7, wherein at least one of the stationary bracket or the movable bracket supports a lens assembly and optically aligns the lens assembly with at least one on-board camera of the mobile device.

11. The accessory clip of claim 7, wherein at least a part of the stationary bracket and the moveable bracket extend over a top edge of the mobile device when secured to the mobile device.

12. The accessory clip of claim 7, wherein at least one of the stationary bracket or the movable bracket comprises an indicator icon indicating an alignment position of the accessory clip on the mobile device.

13. A clamp for releasably coupling one or more optical lenses to a mobile device having a front-facing surface with a first onboard camera and a rear-facing surface with a second onboard camera, the clamp comprising:

a front bracket positionable along the front-facing surface;

a rear bracket movably coupled to the front bracket and positionable along the rear-facing surface;

an actuation assembly coupled to the front bracket and the rear bracket, the actuation assembly comprising:

an actuator positioned along the front bracket and configured to receive a user force;

a pin extending through an opening in the front bracket and fixed to each of the actuator and the rear bracket, wherein the pin is an elongated member having a first pin end and a second pin end opposing the first pin end, and wherein the actuator is fixed to the pin at the first pin end, and wherein the rear bracket is fixed to the pin at the second pin end, and wherein the front bracket is arranged substantially between the rear bracket and the actuator; and a spring arranged substantially between the actuator and the front bracket and along a path of travel of the actuator; and a rear camera lens assembly releasably coupled to the rear bracket; wherein in response to the user force, the actuation assembly moves the rear bracket in a first direction laterally away from the front bracket and compresses the spring; and wherein in response to removal of the user force, the spring exerts a return force that is used by the actuation assembly to move the rear bracket in a second direction laterally towards the front bracket.

14. The clamp of claim 13, wherein the opening of the front bracket substantially conforms to a circumference of the pin, thereby guiding movement of the rear bracket during sliding of the pin through the opening.

15. The clamp of claim 13, wherein:

the spring is a helical coil spring having a first spring end and second spring end opposing the first spring end;

the first spring end is seated at an underside of the actuator;

the second spring end is seated along a face of the front bracket; and the pin extends through a volume defined by the coils of the spring.

* * * * *